US012447707B1

(12) United States Patent
Nakai et al.

(10) Patent No.: US 12,447,707 B1
(45) Date of Patent: Oct. 21, 2025

(54) PRESSING DEVICE

(71) Applicant: KOBE STEEL, LTD., Kobe (JP)

(72) Inventors: Tomomitsu Nakai, Takasago (JP); Akinori Maegawa, Takasago (JP)

(73) Assignee: KOBE STEEL, LTD., Kobe (JP)

( * ) Notice: Subject to any disclaimer, the term of this patent is extended or adjusted under 35 U.S.C. 154(b) by 0 days.

(21) Appl. No.: 18/861,524

(22) PCT Filed: May 16, 2023

(86) PCT No.: PCT/JP2023/018210
§ 371 (c)(1),
(2) Date: Oct. 29, 2024

(87) PCT Pub. No.: WO2023/243286
PCT Pub. Date: Dec. 21, 2023

(30) Foreign Application Priority Data

Jun. 13, 2022 (JP) .................................. 2022-095192

(51) Int. Cl.
*B30B 11/00* (2006.01)
*B30B 1/32* (2006.01)
*B30B 15/16* (2006.01)

(52) U.S. Cl.
CPC ................ *B30B 15/16* (2013.01); *B30B 1/32* (2013.01); *B30B 11/002* (2013.01)

(58) Field of Classification Search
CPC .......... B30B 1/32; B30B 11/002; B30B 15/16
See application file for complete search history.

(56) References Cited

U.S. PATENT DOCUMENTS

| | | | | |
|---|---|---|---|---|
| 5,765,465 A | * | 6/1998 | Gardin .................. | B30B 11/004 92/169.1 |
| 7,565,802 B2 | * | 7/2009 | Bergman .............. | A61L 2/0011 60/486 |

FOREIGN PATENT DOCUMENTS

| | | | | |
|---|---|---|---|---|
| JP | H0694373 | * | 9/1992 | ............. B30B 11/02 |
| JP | 3254256 B2 | | 2/2002 | |
| JP | 2009106175 | * | 5/2009 | ............... F16J 12/00 |
| JP | 2010064076 | * | 3/2010 | ............. B30B 11/00 |

OTHER PUBLICATIONS

International Search Report issued in PCT/JP2023/018210 mailed on Aug. 1, 2023.

* cited by examiner

*Primary Examiner* — Dustin T Nguyen
(74) *Attorney, Agent, or Firm* — Studebaker Brackett PLLC

(57) ABSTRACT

A piston axial force information detection unit (53) detects piston axial force information pertaining to an axial force applied to a piston body (21). A friction information storage unit (62) stores friction information pertaining to a frictional force between a piston seal (23) and a pressure vessel (10) when the piston body (21) moves relative to the pressure vessel (10). A drive control unit (65) controls a drive device (40) on the basis of the piston axial force information and the friction information. In a holding stroke for controlling the pressure inside the pressure vessel (10) so as to be constantly held, the drive control unit (65) controls the drive device (40) so that the piston body (21) reciprocates with respect to the pressure vessel (10).

9 Claims, 7 Drawing Sheets

PRESSING DEVICE

TECHNICAL FIELD

The present invention relates to a pressing device that presses the inside of a pressure vessel.

BACKGROUND ART

For example, PTL 1 describes a pressing device that presses the inside of a pressure vessel by a piston. With the technique described in PTL 1, a relationship between the pressure (vessel internal pressure) inside a pressure vessel and the amount of strain of the piston is measured in advance for each of push and retreat of the piston. Packing resistance is determined from the relationship between the vessel internal pressure and the amount of strain of the piston. The vessel internal pressure is measured by subtracting the packing resistance from the amount of strain of the piston at the time of push of the piston (in the pressurizing stroke), or by adding the packing resistance to the amounts of train of the piston at the time of retreat of the piston (in the depressurizing stroke) (claim 1 in PTL 1). With the technique described in PTL 1, the vessel internal pressure is controlled at a target pressure (set pressure) ([0016] to in PTL 1).

CITATION LIST

Patent Literature

PTL 1: Japanese Patent No. 3254256
PTL 1 does not describe how the vessel internal pressure is controlled in the holding stroke to maintain the vessel internal pressure. It is desired that the pressure inside the pressure vessel be controlled in the holding stroke with high accuracy.

SUMMARY OF INVENTION

It is an object of the present invention to provide a pressing device capable of controlling the pressure inside the pressure vessel in the holding stroke with high accuracy.

Solution to Problem

What is provided by the present invention is a pressing device. The pressing device includes a pressure vessel, a piston body, a piston seal, a piston axial force information detection unit, a driving device, a friction information storage unit, and a drive control unit. The piston body is fitted inside the pressure vessel movably to the insertion side and the extraction side relative to the pressure vessel. The piston seal is provided in the piston body to seal the gap between the piston body and the pressure vessel. The piston axial force information detection unit detects piston axial force information pertaining to the axial force applied to the piston body in the movement direction of the piston body relative to the pressure vessel. The driving device moves the piston body relative to the pressure vessel. The friction information storage unit stores friction information pertaining to the frictional force between the piston seal and the pressure vessel when the piston body moves relative to the pressure vessel. The drive control unit controls the driving device based on the piston axial force information detected by the piston axial force information detection unit, and the friction information stored in the friction information storage unit. In a holding stroke for controlling the pressure inside the pressure vessel so as to be constantly held, the drive control unit controls the driving device so that the piston body performs a reciprocating motion relative to the pressure vessel.

DESCRIPTION OF EMBODIMENTS

Figure 1:
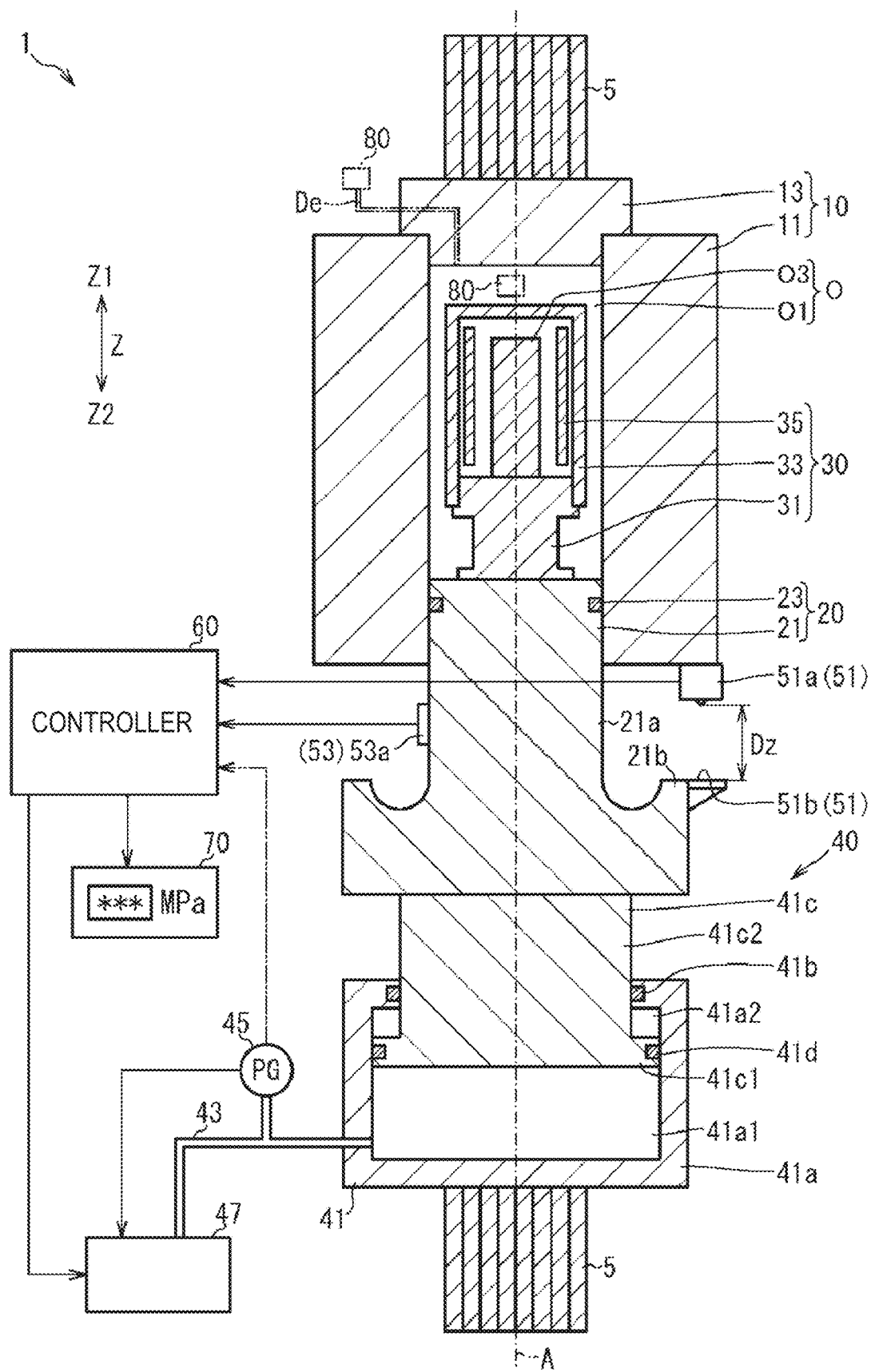
FIG. 1 is a sectional view and the like of a pressing device 1 according to an embodiment of the present invention.

A pressing device 1 according to an embodiment of the present invention will be described with reference to FIG. 1 to FIG. 7.

The pressing device 1 is a device that presses a pressurization target object O in a pressure vessel 10. The pressing device 1 is a piston pressing device that performs pressurization by the pressing force of the piston 20.

The pressing device 1 is e.g., an isostatic pressing (IP) device. The pressing device 1 presses a pressure medium O1 in the pressure vessel 10, thereby isotropically pressurizing a to-be-processed object O3 in the pressure vessel 10 to process the to-be-processed object O3. For example, the pressing device 1 may be a hot isostatic pressing (HIP) device (e.g., a piston hot isostatic pressing device). In this case, the pressing device 1 may be a high-pressure hot isostatic pressing device that presses the pressure of the pressure medium O1 up to approximately 1000 MPa, or may be an ultra-high pressure hot isostatic pressing device that presses the pressure of the pressure medium O1 up to an even higher pressure. For example, the pressing device 1 may be a warm isostatic pressing (WIP) device, or may be a cold isostatic pressing (CIP) device. The pressure medium O1 may be a gas (e.g., a noble gas). The pressure medium O1 may be liquid, or liquid (e.g., molten salt) that solidifies at room temperature, for example.

This pressing device 1 may not press the to-be-processed object O3 by pressurizing the pressure medium O1. The pressurization target object O does not need to include the pressure medium O1 and the to-be-processed object O3. The pressing device 1 may be a device (such as a measurement device, an experiment device) that measures the state of the pressurization target object O. Specifically, for example, the pressing device 1 may be a device that simulates the state of the magma in the ground, or a device that presses and heats the same material as magma, placed in the pressure vessel 10. Alternatively, the pressing device 1 may be a single-crystal growth furnace. For example, the pressing device 1 may be a device that manufactures compound semiconductor single crystal of GaN (gallium nitride). Specifically, for example, the pressing device 1 may be a device to perform a high-temperature and high-pressure synthesis method by which nitrogen gas is dissolved in a gallium solution in an ultra-high pressure nitrogen gas atmosphere to grow crystals in a supersaturation state. In the following, the case will be mainly described where the pressurization target object O includes the pressure medium O1 and the to-be-processed object O3.

<Definition of Direction>

As described later, the piston 20 moves relative to the pressure vessel 10. Let axial direction Z be the movement direction of the piston 20 relative to the pressure vessel 10. Let insertion direction Z1 be the direction (side) in which the piston 20 is inserted into the pressure vessel 10 in the axial direction Z, and extraction direction Z2 be the opposite direction (reverse side). The extraction direction Z2 is the side to which the piston 20 is extracted from the pressure vessel 10. The axial direction Z may be, for example, an up-down direction (vertical direction), a horizontal direction, or a direction inclined from the up-down direction and the horizontal direction. When the axial direction Z is an up-down direction, the insertion direction Z1 may be upward, or downward (the same applies to the extraction direction Z2). Let central axis A be the axis that passes through the center of the piston 20 and extends in the axial direction Z. Let "radial direction" be the diameter direction of a virtual circle (not illustrated) that is on a plane perpendicular to the central axis A and has the center on the central axis A.

The pressing device 1 includes a frame 5, a pressure vessel 10, a piston 20, a pressure vessel inner member 30, a driving device 40, a piston position information detection unit 51, a piston axial force information detection unit 53, a controller 60, and a pressure notification unit 70. At the time of prior measurement mentioned below, the pressing device 1 includes a pressure detection member 80.

The frame 5 is a structure that receives (supports) a force in the axial direction Z. The frame 5 supports the pressure vessel 10 and the driving device 40 (more particularly, the fluid pressure cylinder 41 (described later)). The frame 5 supports the pressure vessel 10 and the fluid pressure cylinder 41 from both outer sides (for example, upper and lower sides) in the axial direction Z. For example, the frame 5 has an oval shape (not illustrated). In this case, the frame 5 includes two semi-circular or substantially semi-circular yoke sections, and two linear column sections that connect the two yoke sections. In this case, the frame 5 illustrated in FIG. 1 is part of the yoke section (yoke frame). Note that the frame 5 is not necessarily in an oval shape, and the frame 5 illustrated in FIG. 1 is not necessarily a yoke frame.

The pressure vessel 10 is a vessel that stores the pressurization target object O. The pressure vessel 10 stores the pressure vessel inner member 30. The pressure vessel 10 is configured to form the space surrounded by the pressure vessel 10 and the piston 20. For example, the pressure vessel 10 includes a pressure vessel cylinder 11, and a pressure vessel lid 13.

The pressure vessel cylinder 11 is a tubular (for example, circular tubular) member extending in the axial direction Z.

The pressure vessel lid 13 closes (seals) the opening on one side (for example, the upper side) of the pressure vessel cylinder 11 in the axial direction Z. When the pressure vessel lid 13 is provided on the upper section of the pressure vessel 10, the pressure vessel lid 13 is an "upper lid". The pressure vessel lid 13 may have a hole (e.g., a gas inlet which is not illustrated) for introducing the pressure medium O1.

The piston 20 is a member that presses the inside of the pressure vessel 10. The piston 20 closes (seals) the opening on the other side (the opposite side to the side on which the pressure vessel lid 13 is provided) of the pressure vessel cylinder 11 in the axial direction Z. When the piston 20 is provided on the lower section of the pressure vessel 10, the piston 20 is a "lower lid". The piston 20 includes a piston body 21, and a piston seal 23.

The piston body 21 is the body part of the piston 20. The piston body 21 is fitted (inserted) into the inside of the pressure vessel 10. The piston body 21 is fitted into the inside of the pressure vessel 10 via the piston seal 23. The piston body 21 is movable relative to the pressure vessel 10 in the insertion direction Z1 and the extraction direction Z2. The piston body 21 is slidable relative to the pressure vessel 10 via the piston seal 23. For example, the piston body 21 includes a piston body columnar section 21a, and a piston body base 21b. The piston body columnar section 21a is the distal end portion of the piston body 21 in the insertion direction Z1. At least part of the piston body columnar section 21a is inserted into the inside of the pressure vessel 10. The piston body columnar section 21a has a columnar shape (e.g., a circular columnar shape) provided to extend in the axial direction Z. The piston body base 21b is the distal end portion of the piston body 21 in the extraction direction Z2. The piston body base 21b is not inserted into the inside of the pressure vessel 10. The piston body base 21b projects radially outward from the piston body columnar section 21a.

The piston seal 23 is a member (packing) that seals the gap between the piston body 21 and the pressure vessel 10. The piston seal 23 is provided in the piston body 21, particularly, in the piston body columnar section 21a. The piston seal 23 is provided in the distal end portion of the piston body columnar section 21a in the insertion direction Z1. The piston seal 23 is provided in the radially outer surface (e.g., an outer circumferential surface) of the piston body columnar section 21a. For example, the piston seal 23 is made of an elastic member (such as a rubber, a resin). The piston seal 23 has a ring shape (e.g., a circular ring shape). The piston seal 23 moves in the axial direction Z integrally with the piston body 21. The piston seal 23 slides relative to the pressure vessel 10.

The piston seal 23 comes into contact with the pressure vessel 10. More particularly, the piston seal 23 comes into contact with the inner surface (e.g., the inner circumferential surface) of the pressure vessel cylinder 11. The piston seal 23 receives pressure from the pressurization target object O (e.g., the pressure medium O1), deforms, and presses the inner surface of the pressure vessel 10 radially outward. Frictional force between the piston seal 23 and the pressure vessel 10 is referred to as "piston seal frictional force". The piston seal frictional force has a non-negligible magnitude under the control of the pressure (referred to as the "vessel internal pressure") inside the pressure vessel 10. Thus, the vessel internal pressure is controlled (described later) based on information (friction information) pertaining to the piston seal frictional force.

The pressure vessel inner member 30 is provided inside the pressure vessel 10. For example, when the pressing device 1 is a hot isostatic pressing device, the pressure vessel inner member 30 includes a support 31, an insulation layer 33, and a heating device 35.

The support 31 supports the to-be-processed object O3 with respect to the piston body 21. The support 31 supports the to-be-processed object O3 so that the to-be-processed object O3 is disposed at the distal end portion of the piston body 21 in the insertion direction Z1. The support 31 supports the insulation layer 33 and the heating device 35 in the same manner as for the to-be-processed object O3.

The insulation layer 33 stores the to-be-processed object O3. The insulation layer 33 insulates the space inside the insulation layer 33 from the space that is inside the pressure vessel 10 and outside the insulation layer 33. The insulation layer 33 is configured to transmit pressure between the space inside the insulation layer 33 and the space that is inside the pressure vessel 10 and outside the insulation layer 33. For example, a gap may be provided between the insulation layer 33 and the support 31.

The heating device 35 (heater, heater element) heats the inside of the pressure vessel 10. For example, the heating device 35 heats the inside of the insulation layer 33 to heat the to-be-processed object O3. The heating device 35 is disposed inside (radially inward of) the insulation layer 33. The heating device 35 is disposed in the periphery (radially outward) of the to-be-processed object O3. When the pressing device 1 is a cold isostatic pressing device, the insulation layer 33 and the heating device 35 may not be provided, and for example, a member (such as a rubber mold) that stores the to-be-processed object O3 may be provided.

The driving device 40 moves (drives) the piston body 21 relative to the pressure vessel 10. The driving device 40 moves the piston body 21 in the axial direction Z. The driving device 40 may be a fluid pressure driving device that moves the piston body 21 by the pressure (fluid pressure) of a working fluid. For example, the driving device 40 may be a hydraulic pressure driving device that moves the piston body 21 by a hydraulic pressure. The driving device 40 may be a device that moves the piston body 21 by power (such as electric power) other than a fluid pressure. In the following, the case will be mainly described where the driving device 40 is a fluid pressure driving device. The driving device 40 includes the fluid pressure cylinder 41, a fluid pressure laid pipe 43, a fluid pressure detection unit 45, and a fluid pressure control unit 47.

The fluid pressure cylinder 41 moves the piston body 21 by a fluid pressure. The fluid pressure cylinder 41 is e.g., a hydraulic cylinder. The fluid pressure cylinder 41 includes a cylinder body 41*a*, a cylinder seal 41*b*, a ram 41*c*, and a ram seal 41*d*.

The cylinder body 41*a* stores the distal end portion of the ram 41*c* in the extraction direction Z2. The cylinder body 41*a* includes a head-side chamber 41*a*1, and a ram-side chamber 41*a*2. The head-side chamber 41*al* is a space (e.g., an oil chamber) to which a working fluid is supplied when the ram 41*c* (the piston body 21) moves in the insertion direction Z1. The head-side chamber 41*a*1 is a space that is inside the cylinder body 41*a*, and on the distal end side of a ram base 41*cl* (described later) in the extraction direction Z2. The ram-side chamber 41*a*2 is a space (e.g., an oil chamber) to which a working fluid is supplied when the ram 41*c* (the piston body 21) moves in the extraction direction Z2. The ram-side chamber 41*a*2 is a space that is inside the cylinder body 41*a*, and on the distal end side of the ram base 41*c*1 in the insertion direction Z1. Note that movement of the ram 41*c* (the piston body 21) in the extraction direction Z2 does not need to be performed by a fluid pressure. For example, movement of the ram 41*c* (the piston body 21) in the extraction direction Z2 may be performed by the elastic force of a spring which is not illustrated, and may be performed by the self-weight of the piston 20.

The cylinder seal 41*b* is a member (packing) that seals the gap between the cylinder body 41*a* and the ram 41*c*. The cylinder seal 41*b* is provided in the cylinder body 41*a*, and, more particularly, provided in the radially inner portion (e.g., the inner circumferential portion) of the distal end portion of the cylinder body 41*a* in the insertion direction Z1. The cylinder seal 41*b* comes into contact with the ram 41*c*, more particularly, comes into contact with the radially outward surface (e.g., the outer circumferential surface) of a ram columnar section 41*c*2 (described later). For example, the cylinder seal 41*b* is made of an elastic member (such as a rubber, a resin). The cylinder seal 41*b* has a ring shape (e.g., a circular ring shape).

The ram 41*c* moves the piston body 21 in the axial direction Z. For example, the ram 41*c* may be a member separated from the piston body 21, and may be fixed to the piston body 21. In this case, the ram 41*c* is connected to the piston body 21 in the axial direction Z. The ram 41*c* is provided in the distal end portion of the piston body 21 in the extraction direction Z2. For example, the ram 41*c* may be formed integrally with the piston body 21. The ram 41*c* moves integrally with the piston body 21. For example, the ram 41*c* includes a ram base 41*c*1, and a ram columnar section 41*c*2. The ram base 41*cl* is the distal end portion of the ram 41*c* in the extraction direction Z2. The ram base 41*cl* is disposed inside the cylinder body 41*a*. The ram base 41*c*1 divides (partitions) the inside of the cylinder body 41*a* into the head-side chamber 41*al* and the ram-side chamber 41*a*2. The ram columnar section 41*c*2 is provided to extend from the ram base 41*cl* in the insertion direction Z1. The ram columnar section 41*c*2 projects from the inside to the outside of the cylinder body 41*a* in the insertion direction Z1. The ram columnar section 41*c*2 has a columnar shape (e.g., a circular columnar shape) extending in the axial direction Z.

The ram seal 41*d* is a member (packing) that seals the gap between the ram 41*c* and the cylinder body 41*a*. The ram seal 41*d* prevents flow-in and flow-out of a working fluid through between the head-side chamber 41*al* and the ram-side chamber 41*a*2. The ram seal 41*d* is provided in the ram 41*c*, more particularly, provided in a radially outward portion (e.g., the outer circumferential surface) of the ram base 41*c*1. The ram seal 41*d* comes into contact with the cylinder body 41*a*, more particularly, comes into contact with the radially inward surface (e.g., the inner circumferential surface) inside the cylinder body 41*a*. For example, the ram seal 41*d* is made of an elastic member (such as a rubber, a resin). The ram seal 41*d* has a ring shape (e.g., a circular ring shape). The ram seal 41*d* moves integrally with the ram 41*c* in the axial direction Z. The ram seal 41*d* slides relative to the cylinder body 41*a*.

The fluid pressure laid pipe 43 is a laid pipe through which a working fluid passes. The fluid pressure laid pipe 43 supplies and discharges a working fluid through between the fluid pressure control unit 47 and the fluid pressure cylinder 41 (more particularly, the head-side chamber 41*a*1). Note that a laid pipe (not illustrated) may be provided for supplying and discharging a working fluid through between the fluid pressure control unit 47 and the ram-side chamber 41*a*2.

The fluid pressure detection unit 45 detects a fluid pressure of the fluid supplied to the fluid pressure cylinder 41. More particularly, the fluid pressure detection unit 45 detects the pressure (fluid pressure) of the working fluid supplied to the fluid pressure cylinder 41 when the piston body 21 moves in the insertion direction Z1. The fluid pressure detection unit 45 outputs (transmits) a detected value (e.g., an electrical signal) to the fluid pressure control unit 47. The fluid pressure detection unit 45 is, for example, a pressure transmitter. The fluid pressure detection unit 45 may detect the fluid pressure inside the cylinder body 41*a* (more particularly, inside the head-side chamber 41*al*), or detect the fluid pressure (for example, the fluid pressure inside the fluid pressure laid pipe 43) of a portion indicating the same or substantially the same value as the fluid pressure inside the cylinder body 41*a*.

The fluid pressure control unit 47 controls the operation of the fluid pressure cylinder 41. The fluid pressure control unit 47 controls the operation of the piston body 21 by controlling the operation of the fluid pressure cylinder 41. The fluid pressure control unit 47 controls the operation of the fluid pressure cylinder 41 based on the fluid pressure detected by the fluid pressure detection unit 45. For example, the fluid pressure control unit 47 is a device (fluid pressure unit) including a plurality of fluid devices. For example, the fluid pressure control unit 47 includes a pump, a valve (such as a relief mechanism), and a control device that controls the pump and the valve based on a signal input to the fluid pressure control unit 47.

The piston position information detection unit 51 detects the position information (the details will be described later) of the piston body 21 relative to the pressure vessel 10. The piston position information detection unit 51 detects the position information of the piston body 21 in the axial direction Z. As described later, the piston body 21 performs a micro reciprocating motion (reciprocating movement) in a holding stroke. The piston position information detection unit 51 is configured to detect a micro movement of the reciprocating motion of the piston body 21. For example, the piston position information detection unit 51 detects position information in a non-contact manner. For example, the piston position information detection unit 51 detects position information by electromagnetic waves. For example, the piston position information detection unit 51 may detect position information by light (e.g., laser light), or may detect position information by electric waves. The piston position information detection unit 51 may detect the position information of the piston body 21 by coming into contact with the piston body 21 or the ram 41*c* (a touch sensor may be used).

When the piston position information detection unit 51 detects position information by electromagnetic waves (e.g., light), the piston position information detection unit 51 includes a sensor body section 51*a*, and a reflection section 51*b*.

The sensor body section 51*a* emits and receives electromagnetic waves (for example, receives light). The sensor body section 51*a* emits electromagnetic waves in the axial direction Z. The sensor body section 51*a* is provided in the pressure vessel 10 or the piston body 21. In the example illustrated in FIG. 1, the sensor body section 51*a* is provided (for example, mounted) in the pressure vessel 10. For example, the sensor body section 51*a* may be provided in the distal end portion (e.g., the end) of the pressure vessel cylinder 11 in the extraction direction Z2. For example, the sensor body section 51*a* may be provided in a radially outward portion (not illustrated) of the pressure vessel cylinder 11.

The reflection section 51*b* includes a surface (e.g., a planar surface) to reflect electromagnetic waves emitted from the sensor body section 51*a*. The reflection section 51*b* is disposed at a position opposed to the sensor body section 51*a* in the axial direction Z. The reflection section 51*b* is provided in one of the pressure vessel 10 and the piston body 21, the one on the side opposite to the side where the sensor body section 51*a* is provided. In the example illustrated in FIG. 1, the reflection section 51*b* is provided in the piston body 21 (for example, the piston body base 21*b*). For example, the reflection section 51*b* is a member separated from the piston body 21. For example, the reflection section 51*b* may have a plate shape (reflection plate), or may not have a plate shape (e.g., a block shape). For example, the reflection section 51*b* may be provided integrally with the piston body 21. For example, the reflection section 51*b* may be part of the piston body base 21*b*. The reflection section 51*b* may be provided in the ram 41*c* (may be provided in the piston body 21 via the ram 41*c*). Note that the sensor body section 51*a* may be provided in the piston body 21, and the reflection section 51*b* may be provided in the pressure vessel 10. For example, the sensor body section 51*a* detects the distance Dz from the sensor body section 51*a* to the reflection section 51*b* in the axial direction Z.

The piston axial force information detection unit 53 detects piston axial force information. The piston axial force information pertains to an axial force (force applied in the axial direction Z) in the axial direction Z, the axial force (referred to as "piston axial force") being applied to the piston body 21. The piston axial force is the sum of a force applied to the piston body 21 due to the vessel internal pressure, and a piston seal frictional force. In a strict sense, the piston axial force is affected by a force other than the vessel internal pressure and the piston seal frictional force, for example, the self-weight of the piston body 21. However, the effect on the piston axial force by the force other than the vessel internal pressure and the piston seal frictional force is negligibly small.

The reason to detect piston axial force information by the piston axial force information detection unit 53 is as follows. In the pressing device 1, it is important to control the vessel internal pressure so that it approaches a set pressure (a target pressure) as much as possible. However, during the actual operation (described later) time of the pressing device 1, it is impossible or difficult to directly detect the vessel internal pressure. An example of the reason is as follows.

[when Vessel Internal Pressure is Detected Outside Vessel]

For example, a pressure derivation member De (e.g., a laid pipe) is provided to derive the pressure medium O1 with a high pressure (for example, in the order of 1000 MPa) from the inside to the outside of the pressure vessel 10. The pressure detection member 80 (described later) detects, outside the pressure vessel 10, the pressure (or some pressure reduced by the pressure) derived by the pressure derivation member De. In this case, the pressure derivation member De has a short life, and may not withstand the actual operation for a long time.

[when Vessel Internal Pressure is Detected Inside Vessel]

For example, the pressure detection member 80 is disposed inside the pressure vessel 10 to detect the pressure of the pressure medium O1. Then, the pressure detection member 80 may not withstand the actual operation for a long time. Therefore, during the actual operation (described later) time of the pressing device 1, it is impossible or difficult to directly detect the vessel internal pressure. Thus, during the time of actual operation of the pressing device 1, the piston axial force information detection unit 53 detects piston axial force information which is convertible to a vessel internal pressure. The vessel internal pressure is then controlled based on the piston axial force information (the details of the control will be described later).

The piston axial force information detected by the piston axial force information detection unit 53 may be the value itself of the piston axial force. The piston axial force information may pertain to (correlate to) the piston axial force. For example, the piston axial force information may include information convertible to a piston axial force, and may include information convertible from a piston axial force. Specifically, for example, the piston axial force information may include the amount of strain of the piston body 21 in the axial direction Z. Note that the axial force of the piston body 21 can be calculated from the amount of strain of the piston body 21 in the axial direction Z by a formula in mechanics of materials. For example, the piston axial force information may include information pertaining to the force for pressing the piston body 21 by the driving device 40 in the insertion direction Z1 (see modifications described later). The piston axial force information may include a pressure (conversion pressure) which is a vessel internal pressure converted from the piston axial force. For example, when the piston axial force information includes the amount of strain of the piston body 21 in the axial direction Z, the piston axial force information detection unit 53 includes a strain gauge 53*a*.

The strain gauge 53*a* detects strain of the piston body 21 in the axial direction Z. The strain gauge 53*a* is mounted on (for example, attached to) the piston body 21. More particularly, the strain gauge 53*a* is mounted on the radially outward surface (e.g., the outer circumferential surface) of the piston body columnar section 21*a*.

Figure 2:
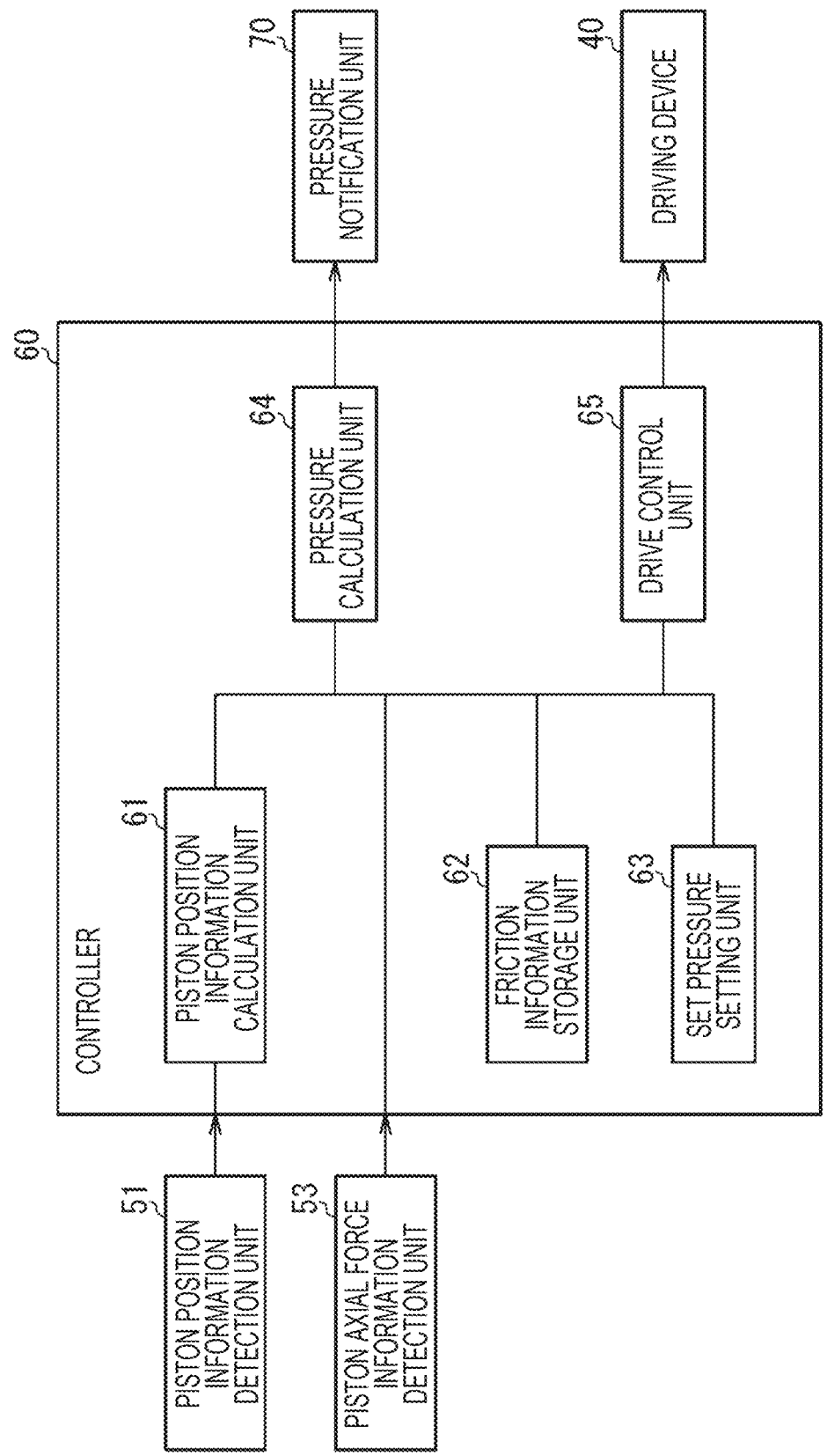
FIG. 2 is a block diagram illustrating a controller 60 and the like illustrated in FIG. 1.

The controller 60 is an apparatus (computer) that performs input and output of a signal, storage of information, and arithmetic (such as calculation, determination). For example, the controller 60 may be a personal computer, or may be a programmable controller. For example, the function of the controller 60 is implemented by executing a program by a calculation unit, the program being stored in a storage unit of the controller 60. As illustrated in FIG. 2, the controller 60 includes a piston position information calculation unit 61, a friction information storage unit 62, a set pressure setting unit 63, a pressure calculation unit 64, and a drive control unit 65. In the following, the components of the pressing device 1 except the controller 60 will be described with reference to FIG. 1, and the controller 60 and the components of the controller 60 will be described with reference to FIG. 2.

The piston position information calculation unit 61 performs calculation pertaining to the position information of the piston body 21 based on the detection value of the piston position information detection unit 51. For example, the position information is used for selection of the later-described friction information. The position information may include information (such as values, coordinates) on the position of the piston body 21. The position information may include information on the movement (change in the position) of the piston body 21. The position information may include information indicating whether the piston body 21 is moving. The position information may include information on the direction (the insertion direction Z1, or the extraction direction Z2) of the movement of the piston body 21. The position information may include information on the movement speed (the magnitude of movement velocity) of the piston body 21.

Friction information storage unit 62 stores friction information. The friction information is information pertaining to piston seal frictional force (the details will be described later).

The set pressure setting unit 63 sets a set pressure in the pressure vessel 10. The set pressure is a target pressure (target vessel internal pressure) in the pressure vessel 10 (the details will be described later). For example, the set pressure setting unit 63 may set a set pressure according to an operation of the controller 60, or may set a set pressure based on the information input to the controller 60 from the outside of the controller 60.

The pressure calculation unit 64 (pressure calculation machine) calculates (estimates) a vessel internal pressure. The pressure calculation unit 64 calculates (estimates) a vessel internal pressure based on the piston axial force information detected by the piston axial force information detection unit 53, and the friction information stored in the friction information storage unit 62 (the details will be described later).

The drive control unit 65 controls the driving device 40. The drive control unit 65 controls the driving device 40 based on the piston axial force information detected by the piston axial force information detection unit 53, and the friction information stored in the friction information storage unit 62 (the details will be described later).

The pressure notification unit 70 (see FIG. 1) notifies of information pertaining to the vessel internal pressure. For example, the pressure notification unit 70 notifies the pressure calculation unit 64 of a calculated value of the vessel internal pressure. Notification by the pressure notification unit 70 may be made by display (the pressure notification unit 70 may be e.g., a pressure indicator). Notification by the pressure notification unit 70 may be made by sound.

The pressure detection member 80 (pressure measuring element) (see FIG. 1) detects a vessel internal pressure. At the time of the prior measurement mentioned below, the pressure detection member 80 is used to directly detect a vessel internal pressure. The pressure detection member 80 is provided removably from the pressure vessel 10. The pressure detection member 80 may be disposed inside the pressure vessel 10, and mounted on the pressure vessel 10 inside the pressure vessel 10 (the details will be described later). The pressure detection member 80 may be disposed outside the pressure vessel 10, and mounted on the pressure vessel 10 via the pressure derivation member De.

The pressure detection member 80 knows in advance a relationship between the pressure around the pressure detection member 80, and the electrical resistance value of the pressure detection member 80. The pressure detection member 80 may further know in advance a relationship between temperature and electrical resistance value. For example, the pressure detection member 80 is a member in which the pressure around the pressure detection member 80, and the electrical resistance value of the pressure detection member 80 are in proportion or substantially in proportion. Specifically, for example, the pressure detection member 80 may include copper alloy containing 12 to 18% by mass of manganese, and 1.5 to 4% by mass of nickel. The pressure detection member 80 is not necessarily a member in which the pressure around the pressure detection member 80, and the electrical resistance value of the pressure detection member 80 are in proportion or substantially in proportion. For example, the pressure detection member 80 may be alloy (Constantan) containing 45 to 50% by mass of nickel, and 50 to 55% by mass of copper (the total of ratios of nickel and copper is 100% by mass or less). The pressure detection member 80 does not need to be provided during the actual operation (described later) time of the pressing device 1.

<Operation>

The pressing device 1 is configured to operate as follows. In the pressing device 1, prior measurement, and actual operation (normal operation) are performed. The components of the pressing device 1 except the controller 60 will be described with reference to FIG. 1, and the controller 60 and the components of the controller 60 will be described with reference to FIG. 2.

<Prior Measurement>

Prior measurement is measurement (operation of the pressing device 1) to obtain the friction information to be stored in the friction information storage unit 62. The pressing device 1 when the prior measurement is performed is a friction information acquisition device to obtain friction information. The prior measurement is performed before the actual operation (in advance). In the prior measurement, the pressure detection member 80 is provided inside or outside the pressure vessel 10. In the prior measurement, a relationship (prior measurement acquisition relationship R (see FIG. 3)) is measured between the piston axial force information detected by the piston axial force information detection unit 53, and the internal pressure (referred to as the "vessel internal actual pressure") detected by the pressure detection member 80.

<Range of Acquisition of Prior Measurement Acquisition Relationship R>

Figure 3:
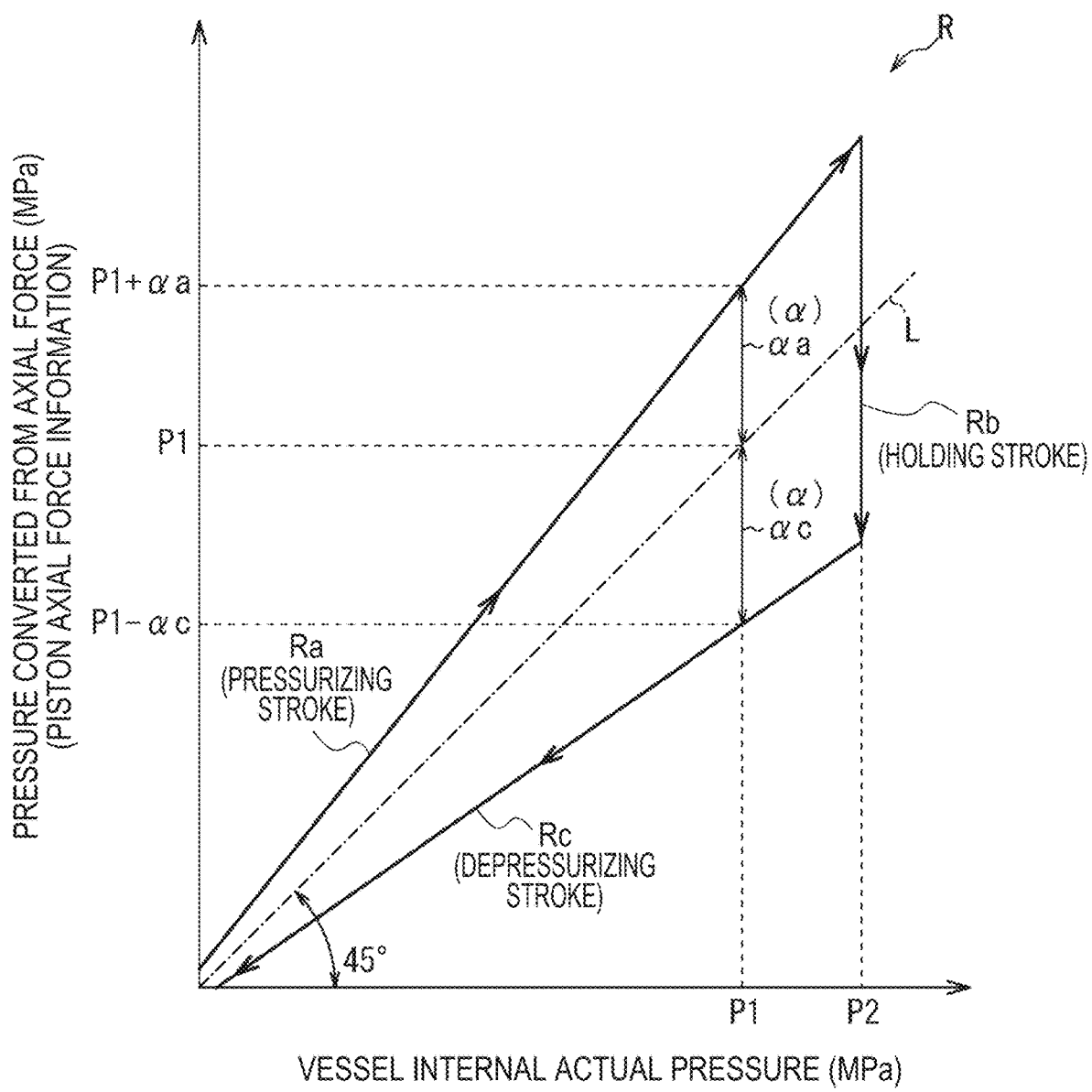
FIG. 3 is a graph showing information obtained by a prior measurement in the pressing device 1 illustrated in FIG. 1.

The prior measurement acquisition relationship R illustrated in FIG. 3 is acquired over the range (used axial force range) of the piston axial force information at the time of actual operation. The prior measurement acquisition relationship R is acquired so as to include the entirety of the used axial force range. For example, when the piston axial force information is a conversion pressure (described later) which is a vessel internal pressure converted from the piston axial force of the piston body 21, the prior measurement acquisition relationship R is acquired over the range (used conversion pressure range) of conversion pressure at the time of actual operation. The prior measurement acquisition relationship R is acquired over the range (used vessel internal actual pressure range) of the vessel internal actual pressure range at the time of actual operation. The prior measurement acquisition relationship R is acquired so as to include the entirety of the used vessel internal actual pressure range.

<Presence/Absence of Movement of Piston Body 21 and Direction of Movement in Prior Measurement>

In the prior measurement, the prior measurement acquisition relationship R when the piston body 21 moves in the axial direction Z relative to the pressure vessel 10 is acquired. The prior measurement acquisition relationship R is preferably acquired for each direction of the movement of the piston body 21 relative to the pressure vessel 10. More particularly, it is preferable that the later-described "relationship Ra in movement in the insertion direction Z1", and the later-described "relationship Rc in movement in the extraction direction Z2" be acquired. In the prior measurement, "relationship Rb at the time of rest" may be acquired, which is the prior measurement acquisition relationship R when the piston body 21 is still relative to the pressure vessel 10.

<Movement Speed of Piston Body 21 in Prior Measurement>

In the prior measurement, the prior measurement acquisition relationship R may be acquired at the movement speed of the piston body 21 in one pattern. In this case, the movement speed in the aforementioned "one pattern" is preferably the same or substantially the same as the movement speed of the piston body 21 at the time of actual operation. In the prior measurement, the prior measurement acquisition relationship R may be acquired at each of the movement speeds of the piston body 21 in a plurality of patterns. In this case, the graphs as illustrated in FIG. 3 are obtained in a plurality of patterns.

<Specific Examples of Prior Measurement Acquisition Relationship R>

Specific examples of prior measurement acquisition relationship R (relationship between the piston axial force information and the vessel internal actual pressure) will be described. In the example illustrated in FIG. 3, the piston axial force information is conversion pressure. The conversion pressure is calculated, for example, as follows. The axial force of the piston body 21 is calculated from the amount of strain of the piston body 21 obtained from the strain gauge 53*a*. As described above, the axial force of the piston body 21 is the sum of the piston seal frictional force and a force due to the pressure received by the piston body 21. The conversion pressure is the value obtained by dividing the axial force of the piston body 21 by the pressure receiving area of the piston body 21. The aforementioned "pressure receiving area" is the area of a portion of the piston body 21, the portion receiving pressure in the axial direction Z from the pressurization target object O (the pressure medium O1). Specifically, for example, the pressure receiving area is the area of the piston body columnar section 21*a* as seen in the insertion direction Z1.

The prior measurement acquisition relationship R includes the relationship Ra in movement in the insertion direction Z1, the relationship Rb at the time of rest, and the relationship Rc in movement in the extraction direction Z2. In the example illustrated in FIG. 3, the prior measurement acquisition relationship R is acquired in the order (process) of the relationship Ra in movement in the insertion direction Z1, the relationship Rb at the time of rest, and the relationship Rc in movement in the extraction direction Z2. The prior measurement may be started in pre-pressed state of the pressure vessel 10, and the prior measurement acquisition relationship R may be acquired in the order of the relationship Rc in movement in the extraction direction Z2, and the relationship Ra in movement in the insertion direction Z1. In the following, the case will be mainly described where the piston axial force information is conversion pressure.

A deviation occurs between the conversion pressure and the vessel internal actual pressure. Let deviation amount α be the amount of the deviation. The deviation amount α is the amount of deviation of conversion pressure with respect to line L with efficiency of 100%. The line L with efficiency of 100% indicates the relationship between the vessel internal actual pressure and the conversion pressure under the assumption that the vessel internal actual pressure is equal to the conversion pressure. The deviation amount α occurs due to the piston seal frictional force. Specifically, the deviation amount α is the value obtained by dividing the piston seal frictional force by the pressure receiving area of the piston body 21.

The relationship Ra in movement in the insertion direction Z1 is the prior measurement acquisition relationship R when the piston body 21 moves in the insertion direction Z1 relative to the pressure vessel 10 (in the pressurizing stroke (the details of each process will be described later)). In the relationship Ra in movement in the insertion direction Z1, the higher the actual pressure, the higher the conversion pressure. Let deviation amount αa be the deviation amount α in the relationship Ra in movement in the insertion direction Z1. The higher the conversion pressure (the higher the actual pressure), the greater the deviation amount αa. The deviation amount αa is the value obtained by subtracting the vessel internal actual pressure from the conversion pressure. At the start time (at the start time of a pressurizing stroke) of movement of the piston body 21 in the insertion direction Z1, until the piston body 21 is pushed in the insertion direction Z1 by a force exceeding the piston seal frictional force, the piston body 21 does not move in the insertion direction Z1 and the vessel internal actual pressure does not increase (see the lower left portion of the graph).

The relationship Rb at the time of rest is the prior measurement acquisition relationship R when the piston body 21 is still relative to the pressure vessel 10 (holding stroke). In the relationship Rb at the time of rest, the actual pressure is maintained at pressure P2 which is constant (or substantially constant). Note that the relationship Rb at the time of rest may not be acquired in the prior measurement.

The relationship Rc in movement in the extraction direction Z2 is the prior measurement acquisition relationship R when the piston body 21 moves in the extraction direction Z2 relative to the pressure vessel 10 (depressurizing stroke). In the relationship Rc in movement in the extraction direction Z2, the higher the vessel internal actual pressure, the lower the conversion pressure. Let deviation amount αc be the deviation amount α in the relationship Rc in movement in the extraction direction Z2. The higher the conversion pressure (the higher the actual pressure), the greater the deviation amount αc. The deviation amount αc is the value obtained by subtracting the conversion pressure from the vessel internal actual pressure. In the example illustrated in FIG. 3, the deviation amount αc with the vessel internal actual pressure at a pressure P1 is greater than the deviation amount αa with the vessel internal actual pressure at the pressure P1. When the vessel internal actual pressure is the pressure P1, the deviation amount ac may be less than the deviation amount αa, or may be equal to the deviation amount ca.

The respective graphs of the relationship Ra in movement in the insertion direction Z1, the relationship Rb at the time of rest, and the relationship Rc in movement in the extraction direction Z2 in the example illustrated in FIG. 3 are linear, however, the graphs are not necessarily linear, and may be curved. For example, the graph of at least one of the relationship Ra in movement in the insertion direction Z1 and the relationship Rc in movement in the extraction direction Z2 may be curved at a portion near the holding stroke.

<Specific Example of Prior Measurement>

In the prior measurement, the pressure detection member 80 detects a vessel internal actual pressure. The pressure detection member 80 may be disposed inside the pressure vessel 10, or disposed outside the pressure vessel 10.

A specific example when the pressure detection member 80 detects a vessel internal actual pressure outside the pressure vessel 10 (when friction information is acquired with the pressure detection member 80 disposed outside the pressure vessel 10) is as follows. The pressure derivation member De (e.g., a laid pipe) is provided for deriving the pressure medium O1 with a high pressure (for example, in the order of 1000 MPa) from the inside to the outside of the pressure vessel 10. For example, the pressure derivation member De is provided in a hole of the pressure vessel 10 (more particularly, the pressure vessel lid 13). The pressure detection member 80 then detects, outside the pressure vessel 10, the pressure (or some pressure reduced by the pressure) derived by the pressure derivation member De. In this example, a high pressure (for example, in the order of 1000 MPa) is applied to the pressure derivation member De. The pressure derivation member De may not withstand the actual operation for a long time. However, the pressure derivation member De can sufficiently withstand the prior measurement (for example, pressurization in several tens of strokes) for a shorter time than the time of actual operation (a pressure derivation member that can withstand the prior measurement is used). After being used in the prior measurement, the pressure derivation member De is preferably detached from the pressure vessel 10 at the time of actual operation.

A specific example when the pressure detection member 80 detects a vessel internal actual pressure inside the pressure vessel 10 (when friction information is acquired with the pressure detection member 80 disposed inside the pressure vessel 10) is as follows. The pressure detection member 80 is disposed inside the pressure vessel 10 removably from the inside of the pressure vessel 10. A wire (not illustrated) is connected to the pressure detection member 80. The wire is for measuring, for example, the electrical resistance of the pressure detection member 80. The wire is connected to the pressure detection member 80, and derived to the outside of the pressure vessel 10 via a feed-through, for example. The pressure detection member 80 then detects the pressure inside the pressure vessel 10. After being used in the prior measurement, the pressure detection member 80 is preferably detached from the pressure vessel 10 at the time of actual operation. At the time of actual operation, the temperature inside the pressure vessel 10 exceeds the heat resistance of the pressure detection member 80, which effects on the performance of pressure detection by the pressure detection member 80, and the accuracy of detection of the vessel internal actual pressure may deteriorate, or the detection may become impossible.

<Other Conditions for Prior Measurement>

It is preferable that the conditions affecting the friction information be the same between the prior measurement and the actual operation as much as possible. For example, it is preferable that the temperature of the piston seal 23 be the same between the prior measurement and the actual operation as much as possible. Specifically, for example, when the inside of the insulation layer 33 reaches 2000° C. at the time of actual operation, the space inside the pressure vessel 10 and outside the insulation layer 33 may be at approximately 100° C., and the piston seal 23 also may be at approximately 100° C. In this case, it is preferable that at the time of prior measurement also, the temperature of the piston seal 23 be set to 100° C. or approximately 100° C. If the effect on the friction information is small, when the piston seal 23 is set to 100° C. at the time of actual operation, the piston seal 23 may be set to room temperature (approximately 20° C.) at the time of prior measurement. Note that the above-mentioned values of temperature are only examples, and the above-mentioned values can be set to various values. Conditions having no effect or substantially no effect on the friction information do not need to be the same between the prior measurement and the actual operation. For example, at the time of prior measurement, the pressure vessel inner member 30 and the to-be-processed object O3 do not need to be provided inside the pressure vessel 10.

<Friction Information Stored in Friction Information Storage Unit 62>

The friction information stored in the friction information storage unit 62 includes information pertaining to the piston seal frictional force when the piston body 21 moves relative to the pressure vessel 10. The friction information is acquired (set) based on the prior measurement acquisition relationship R obtained by the prior measurement. The friction information may be the prior measurement acquisition relationship R, or may be information calculated (derived) from the prior measurement acquisition relationship R.

For example, the friction information is a relationship (e.g., a graph, a map) between the piston axial force information, and the magnitude of a value pertaining to the piston seal frictional force. The friction information may be a relationship between the piston axial force information and the deviation amount α. The deviation amount α in this case is referred to as the "pressure correction value data". The friction information may be a relationship between the piston axial force information, and the value (estimated value of the vessel internal pressure) obtained by adding or subtracting the deviation amount α to or from the conversion pressure. The friction information may be a relationship between the piston axial force information, and the magnitude of the piston seal frictional force.

The friction information storage unit 62 preferably stores friction information for each direction of the movement of the piston body 21. In this case, the friction information storage unit 62 stores the friction information when the piston body 21 moves in the insertion direction Z1 relative to the pressure vessel 10. The friction information is set based on the relationship Ra in movement in the insertion direction Z1. In addition, the friction information storage unit 62 stores the friction information when the piston body 21 moves in the extraction direction Z2 relative to the pressure vessel 10. The friction information is set based on the relationship Rc in movement in the extraction direction Z2. Note that the friction information storage unit 62 may not store (or may store) friction information based on the relationship Rb at the time of rest.

The friction information storage unit 62 preferably stores friction information for each of movement speeds in a plurality of patterns of the piston body 21. More particularly, the friction information storage unit 62 preferably stores friction information for each of movement speeds in a plurality of patterns of the piston body 21 relative to the pressure vessel 10.

<Calibration of Friction Information>

The friction information may be calibrated (corrected, updated) as needed. For example, after the actual operation is performed, prior measurement is performed again as needed, and the friction information may be calibrated. In this case, the pressing device 1 can maintain highly accurate control of the vessel internal pressure.

<Actual Operation>

The actual operation is an operation of the pressing device 1 to control the vessel internal pressure based on friction information. When the pressing device 1 is a device that processes the to-be-processed object O3, the actual operation is an operation for processing the to-be-processed object O3. When the pressing device 1 is a device that measures the state of a pressurization target object O, the actual operation is an operation for measuring the state of the pressurization target object O.

<Overview of Actual Operation>

The overview of the procedure of the actual operation is, for example, as follows. A set pressure (target pressure) is set by the set pressure setting unit 63, and, for example, a set pattern for the set pressure is set (see FIG. 4). The set pattern is information pertaining to a relationship between set pressure and time. The piston 20 is inserted into the pressure vessel 10. The pressurization target object O (e.g., the pressure medium O1 and the to-be-processed object O3) is placed in the pressure vessel 10. Before the start or concurrently with the start of a pressurizing stroke, the heating device 35 starts (turns on) heating inside the pressure vessel 10. The pressing device 1 then performs a pressurizing stroke, a holding stroke, and a depressurizing stroke in accordance with the set pattern (see FIG. 4). The pressurizing stroke may be performed in one stage, or performed in multiple stages (the same applies to the depressurizing stroke). In the example illustrated in FIG. 4, the pressurizing stroke is performed in two stages, and the depressurizing stroke is performed in one stage. In the example illustrated in FIG. 4, the pressing device 1 performs each of a pressurizing stroke, a holding stroke, a pressurizing stroke, a holding stroke, and a depressurizing stroke in that order.

<Overview of Control of Vessel Internal Pressure>

The drive control unit 65 controls the driving device 40 based on the piston axial force information and the friction information in each of a pressurizing stroke, a holding stroke, and a depressurizing stroke. The drive control unit 65 controls the driving device 40, thereby controlling the movement of the piston body 21 in the axial direction Z to control the vessel internal pressure. Because the vessel internal pressure is controlled based on the piston axial force information and the friction information, the vessel internal pressure does not need to be directly detected (by the pressure detection member 80). Thus, the vessel internal pressure can be controlled with high accuracy without deriving the pressure inside the pressure vessel 10 to the outside of the pressure vessel 10 or without providing the pressure detection member 80 inside the pressure vessel 10.

<Pressurizing Stroke>

In the pressurizing stroke, the drive control unit 65 controls the driving device 40 to move the piston body 21 in the insertion direction Z1. The direction of the movement of the piston body 21 in the pressurizing stroke is limited to the insertion direction Z1 (limited to one direction). In the pressurizing stroke, the piston body 21 may perform a reciprocating motion (described later) (see FIG. 7). In the pressurizing stroke, the vessel internal pressure increases with time. The change in the vessel internal pressure in the pressurizing stroke is substantially limited to the change due to the movement of the piston body 21 (the same applies to the depressurizing stroke). In a strict sense, in the pressurizing stroke, the vessel internal pressure changes, for example, due to a temperature change inside the pressure vessel 10 caused by the heat of the heating device 35. However, change in the vessel internal pressure due to a factor other than the movement of the piston body 21 is negligibly small (even the change is neglected, there is no effect or substantially no effect on the control of the vessel internal pressure) (the same applies to the depressurizing stroke). The control of the driving device 40 by the drive control unit 65 in the pressurizing stroke is the same as the control of the driving device 40 at the time of movement in the insertion direction Z1 in the reciprocating motion of the piston body 21 in the later-described holding stroke.

<Depressurizing Stroke>

In the depressurizing stroke, the drive control unit 65 controls the driving device 40 so that the piston body 21 moves in the extraction direction Z2. The direction of the movement of the piston body 21 in the depressurizing stroke is limited to the extraction direction Z2 (limited to one direction). In the depressurizing stroke, the piston body 21 may perform a reciprocating motion. In the depressurizing stroke, the vessel internal pressure decreases with time. The control of the driving device 40 by the drive control unit 65 in the depressurizing stroke is the same as the control of the driving device 40 at the time of movement in the extraction direction Z2 in the reciprocating motion of the piston body 21 in the later-described holding stroke.

<Holding Stroke>

In the holding stroke, the drive control unit 65 controls the driving device 40 to maintain the vessel internal pressure at a substantially constant level. In the holding stroke, the drive control unit 65 causes the piston body 21 to perform a reciprocating motion at a substantially constant position (the details of the reciprocating motion will be described later).

For example, when the pressing device 1 is an isostatic pressing device to process the to-be-processed object O3, the most important stroke between the pressurizing stroke, the holding stroke, and depressurizing stroke is the holding stroke. In the holding stroke, it is important to maintain the to-be-processed object O3 at a target temperature, and maintain the pressure to press the to-be-processed object O3 at a set pressure. In the holding stroke, it is aimed that the temperature distribution of the to-be-processed object O3 becomes uniform at a target temperature (for example, 2000° C.). Thus, in the holding stroke, it is aimed that the temperature distribution inside the pressure vessel 10 achieves a steady state (for example, a state in which constant heat continues to be released from the inside to the outside of the insulation layer 33). However, the temperature distribution inside the pressure vessel 10 does not necessarily achieve a target state immediately after the start of the holding stroke. The holding stroke is performed for a long time (for example, several hours) so that the temperature distribution inside the pressure vessel 10 achieves a target state. Even when the pressing device 1 does not process the to-be-processed object O3, in some situations, it is important to maintain the inside of the pressure vessel 10 at a set pressure and a target temperature.

<Problem when Piston Body 21 is at Rest>

When the piston body 21 is still relative to the pressure vessel 10, it is difficult to control the vessel internal pressure with high accuracy. The reasons for this are that it is difficult to estimate the vessel internal pressure ([Example 1 of Problem] mentioned below), and it is difficult for the piston body 21 to follow in response to change in the vessel internal pressure ([Example 2 of Problem] mentioned below).

Example 1 of Problem

As illustrated in FIG. 3, in the relationship Rb at the time of rest obtainable in the prior measurement, the piston body 21 stays at a constant position, and the vessel internal actual pressure is at constant pressure P2. However, at the time of actual operation, even when the position of the piston body 21 is constant, the vessel internal actual pressure is not constant, and varies (fluctuates). For example, the temperature inside the pressure vessel 10 has an inevitable change in terms of time and distribution. For example, when the heating device 35 heats a pressurization target object O, the temperature distribution inside the pressure vessel 10 varies. In this situation, the average temperature inside the pressure vessel 10 increases with time. When the temperature inside the pressure vessel 10 changes, the vessel internal pressure also changes according to Boyle-Charles law. Therefore, even when the position of the piston body 21 is constant, the vessel internal actual pressure is not constant.

As is apparent from FIG. 3, in the relationship Rb at the time of rest, for the value of one vessel internal actual pressure (e.g., the pressure P2), the conversion pressure is not determined to be a value. Specifically, in the holding stroke, it is unknown whether the value (conversion pressure) of the piston axial force information is shifted (higher or lower than) from or the same as the line L with efficiency of 100%. This equivalently indicates that even when the conversion pressure is determined to be a value, the vessel internal actual pressure is not determined to be a value. Thus, it is difficult to calculate (estimate) the vessel internal pressure from the conversion pressure with high accuracy. As a consequence, when the piston body 21 is still relative to the pressure vessel 10, it is difficult to control the vessel internal pressure with high accuracy.

Example 2 of Problem

In general, a static friction force is greater than a dynamic friction force. Therefore, even if the vessel internal pressure changes when the piston body 21 is still relative to the pressure vessel 10, the piston body 21 is likely to remain still relative to the pressure vessel 10. More particularly, when the temperature inside the pressure vessel 10 rises, the vessel internal pressure tends to increase according to Boyle-Charles law. In this situation, when the piston seal frictional force is less than the force received by the piston body 21 due to the vessel internal pressure, the piston body 21 moves in the extraction direction Z2, the vessel internal pressure decreases, and the vessel internal pressure approaches the set pressure. However, when the piston seal frictional force is greater than or equal to the force received by the piston body 21 due to the vessel internal pressure, even if the temperature inside the pressure vessel 10 rises, the piston body 21 does not move in the extraction direction Z2. Then the vessel internal pressure increases, and the vessel internal pressure deviates from the set pressure. When the temperature inside the pressure vessel 10 falls, the vessel internal pressure decreases, and the vessel internal pressure deviates from the set pressure. As a consequence, when the piston body 21 is still relative to the pressure vessel 10, it is difficult to control the vessel internal pressure with high accuracy.

<Overview of Reciprocating Motion>

Thus, the pressing device 1 of the present embodiment is configured to operate as follows in the holding stroke. The drive control unit 65 controls the driving device 40 so that the piston body 21 performs a reciprocating motion (reciprocating motion in the axial direction Z) relative to the pressure vessel 10. The driving device 40 causes the piston body 21 to perform a reciprocating motion relative to the pressure vessel 10. The piston body 21 performs a reciprocating motion relative to the pressure vessel 10. The piston body 21 performs a reciprocating motion with small amplitudes (finely) in the axial direction Z.

In the holding stroke, the piston body 21 performs a reciprocating motion relative to the pressure vessel 10, thus the vessel internal pressure can be controlled with high accuracy. The reasons are, for example, as follows.

Example 1 of Reason

Because the piston body 21 performs a reciprocating motion relative to the pressure vessel 10, the friction information when the piston body 21 moves in the axial direction Z can be utilized. According to the friction information when the piston body 21 moves in the axial direction Z, when the value of the piston axial force information is determined to be a value, the vessel internal pressure is determined to be a value (see FIG. 3). Thus, the vessel internal pressure can be calculated (estimated) with high accuracy. As a consequence, the vessel internal pressure can be controlled with high accuracy.

Example 2 of Reason

Because the piston body 21 performs a reciprocating motion relative to the pressure vessel 10, the piston seal frictional force is a dynamic friction force less than a static friction force. Thus, the position of the piston body 21 can easily follow in response to change in the vessel internal pressure due to a temperature change in the pressure vessel 10. For example, when the temperature inside the pressure vessel 10 rises, and the vessel internal pressure is going to increase, the piston body 21 (for example, the central position of the reciprocating motion of the piston body 21) is likely to move in the extraction direction Z2. In addition, when the temperature inside the pressure vessel 10 falls, and the vessel internal pressure is going to decrease, the piston body 21 (for example, the central position of the reciprocating motion of the piston body 21) is likely to move in the insertion direction Z1. Therefore, the position of the piston body 21 easily follows in response to change in the vessel internal pressure, thus it is possible to bring the vessel internal pressure closer to the set pressure. As a consequence, the vessel internal pressure can be controlled with high accuracy.

<Details of Reciprocating Motion>

As described above, the drive control unit 65 controls the driving device 40 based on the piston axial force information and the friction information. The details of the control are as follows.

<Detection Pertaining to Piston Body 21>

The piston position information detection unit 51 detects piston axial force information (for example, strain of the piston body 21), and outputs a detected value to the controller 60. For example, the controller 60 calculates a conversion pressure (see FIG. 3) (an example of the piston axial force information) from a detected value of the piston axial force information detection unit 53.

For example, the piston position information detection unit 51 may detect the position information of the piston body 21, and output a detected value to the controller 60. The piston position information calculation unit 61 may determine whether the piston body 21 is moving from the detected value of the piston position information detection unit 51. The piston position information detection unit 51 may determine from the detected value of the piston position information detection unit 51 whether the direction of the movement of the piston body 21 is the insertion direction Z1 or the extraction direction Z2. The piston position information detection unit 51 may calculate the movement speed (more particularly, the magnitude of the movement velocity) of the piston body 21 from the detected value of the piston position information detection unit 51.

<Acquisition, Selection of Friction Information>

The drive control unit 65 acquires friction information from the friction information storage unit 62. In the prior measurement, the relationship Ra (see FIG. 3) in movement in the insertion direction Z1 is obtained by the pressing device 1 performing a pressurizing stroke, and the relationship Rc (see FIG. 3) in movement in the extraction direction Z2 is obtained by the pressing device 1 performing a depressurizing stroke. The reciprocating motion of the piston body 21 in the holding stroke of the actual operation is repeat of the movement of the piston body 21 in the insertion direction Z1, and the movement of the piston body 21 in the extraction direction Z2. Thus, the reciprocating motion in the holding stroke is essentially the same as the pressurizing stroke and the depressurizing stroke in that the reciprocating motion is the movement of the piston body 21 in the insertion direction Z1 and the extraction direction Z2. Thus, the reciprocating motion of the piston body 21 in the holding stroke of the actual operation can be controlled using the friction information obtained from the pressurizing stroke and the depressurizing stroke in the prior measurement. The friction information used in the holding stroke may be exactly the same as the friction information used in the pressurizing stroke (or the depressurizing stroke), or may be information obtained by correcting the friction information used in the pressurizing stroke (or the depressurizing stroke).

The drive control unit 65 preferably selects friction information corresponding to the direction (the insertion direction Z1 or the extraction direction Z2) of the movement of the piston body 21 relative to the pressure vessel 10. The direction of the movement of the piston body 21 is directly or indirectly acquired.

Example 1 of Direction Acquisition

For example, the direction of the movement of the piston body 21 is preferably detected directly by the piston position information detection unit 51. In this case, it is possible to reliably detect that the piston body 21 is moving in the axial direction Z.

Example 2 of Direction Acquisition

The direction of the movement of the piston body 21 may be indirectly acquired.

Example 2a of Direction Acquisition

The direction of the movement of the piston body 21 may be acquired based on the information (for example, the direction of flow, pressure of a working fluid) pertaining to drive of the driving device 40.

Example 2b of Direction Acquisition

The direction of the movement of the piston body 21 may be acquired based on a command (for example, a signal indicating the direction of the drive of the piston body 21) from the controller 60 to the driving device 40.

The drive control unit 65 preferably selects friction information corresponding to the movement speed (the movement speed in the axial direction Z) of the piston body 21 relative to the pressure vessel 10. The movement speed of the piston body 21 is directly or indirectly acquired.

Example 1 of Speed Acquisition

The movement speed of the piston body 21 may be directly detected by the piston position information detection unit 51. In this case, the movement speed of the piston body 21 in the axial direction Z can be reliably detected. For example, the movement speed of the piston body 21 is calculated based on the position of the piston body 21 detected by the piston position information detection unit 51.

Example 2 of Speed Acquisition

The movement speed of the piston body 21 may be indirectly acquired.

Example 2a of Speed Acquisition

The movement speed of the piston body 21 may be acquired based on the information (for example, the flow speed of a working fluid) pertaining to drive of the driving device 40.

Example 2b of Speed Acquisition

The movement speed of the piston body 21 may be acquired based on a command (for example, a signal indicating the speed of the drive of the piston body 21) from the controller 60 to the driving device 40.

When the movement speed of the reciprocating motion of the piston body 21 is constant (in period except when the direction of movement is switched, and a time interval near the time), friction information corresponding to the movement speed of the piston body 21 does not need to be selected. In addition, in the prior measurement, friction information does not need to be acquired for each of movement speeds in a plurality of patterns of the piston body 21. Therefore, it is possible to reduce the number of times (required number of times) of prior measurement to acquire friction information.

<Instruction to Driving Device 40>

The drive control unit 65 sets (calculates) the content of instruction to be output to the driving device 40. The drive control unit 65 sets the content of instruction to the driving device 40 based on the piston axial force information and the friction information so that the vessel internal pressure approaches a set pressure. The content of instruction to the driving device 40 is, for example, as follows.

Example 1 of Instruction

The instruction to the driving device 40 may be information indicating the position of the piston body 21 in the axial direction Z.

Example 2 of Instruction

The instruction to the driving device 40 may be information pertaining to the force for pressing the piston body 21 by the driving device 40.

Example 2a of Instruction

The instruction to the driving device 40 may be an instruction (instruction to the head-side chamber 41a1 for pressure) for the pressure of a working fluid in order to press the piston body 21 by the driving device 40.

Example 2b of Instruction

Figure 4:
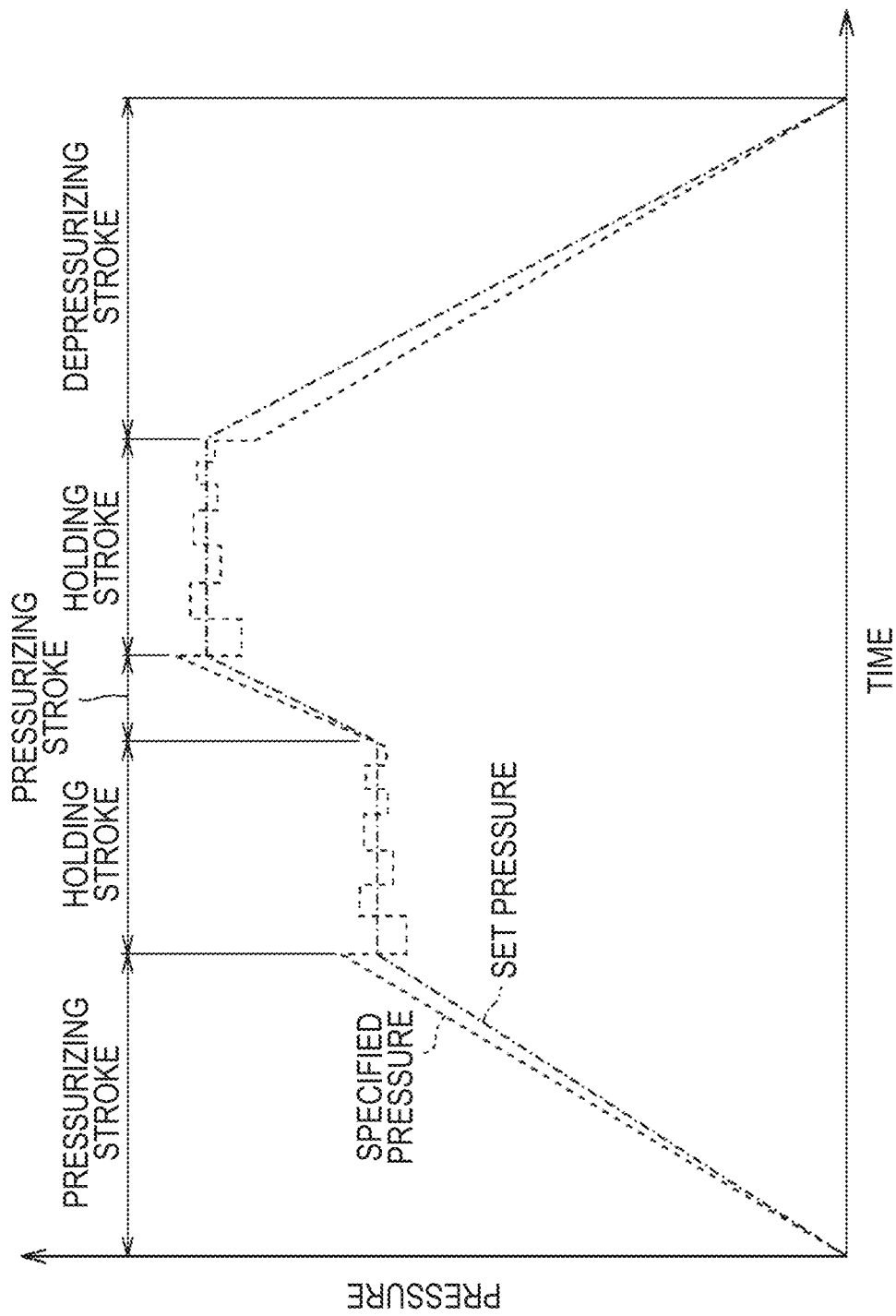
FIG. 4 is a graph showing a set pressure set by a set pressure setting unit 63 illustrated in FIG. 2.
Figure 5:
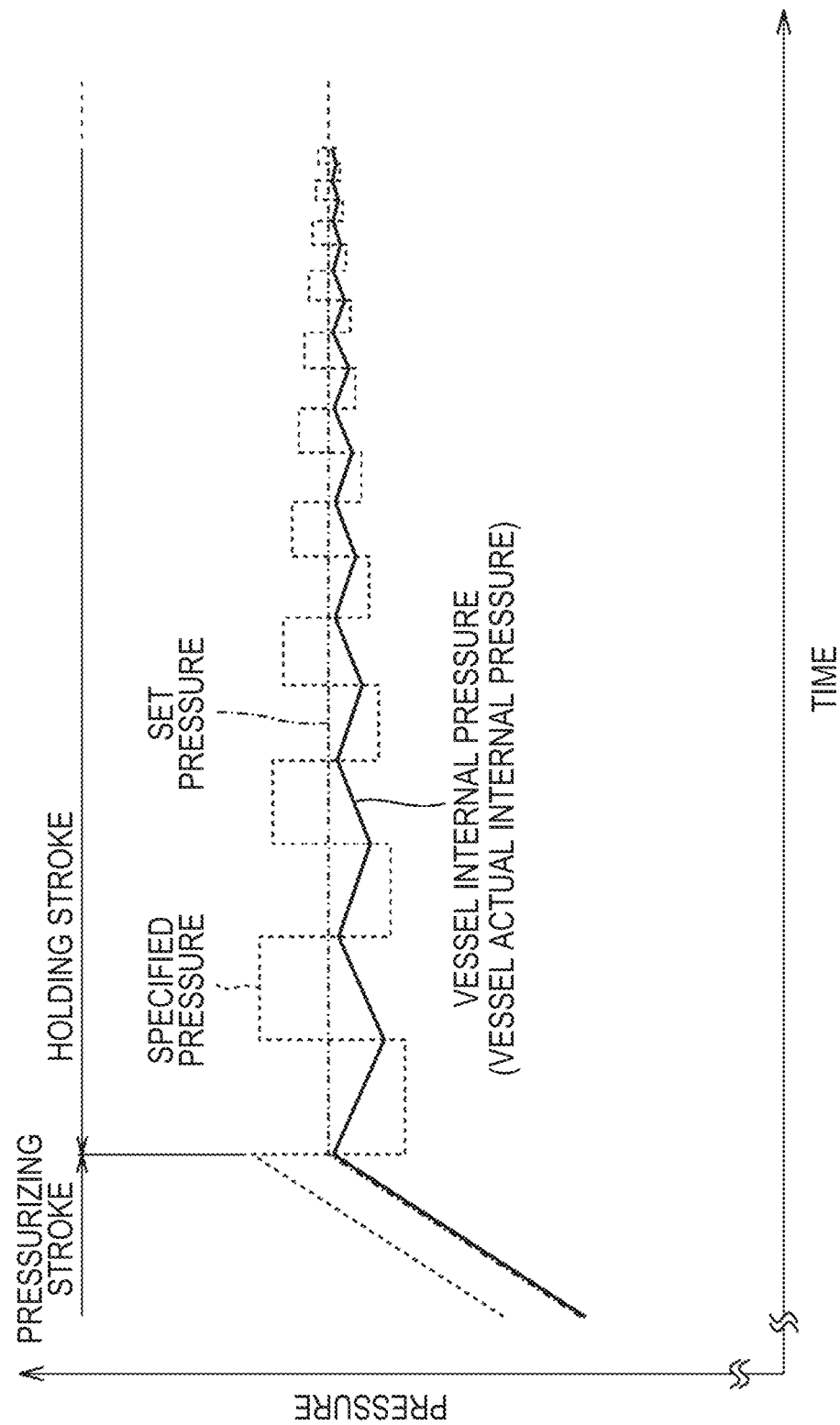
FIG. 5 is a graph showing the vessel internal pressure in a holding stroke illustrated in FIG. 4.

The instruction to the driving device 40 may be a "specified pressure" (see FIG. 4). The specified pressure is a target value of the vessel internal pressure under the assumption that there is no piston seal frictional force. As a practical matter, there is a piston seal frictional force. Thus, when the piston body 21 moves in the insertion direction Z1, the specified pressure is set higher than the set pressure. When the piston body 21 moves in the extraction direction Z2, the specified pressure is set lower than the set pressure. Specifically, for example, FIG. 5 shows a relationship between the specified pressure, the set pressure, and the vessel internal actual pressure. In the example illustrated in FIG. 5, in the holding stroke, a specified pressure higher than the set pressure, and a specified pressure lower than the set pressure are alternately specified (so as to interpose the set pressure therebetween). Then the piston body 21 performs a reciprocating motion, and the vessel internal actual pressure repeats rise (pressurization) and fall (depressurization).

The driving device 40 is driven according to the instruction output from the drive control unit 65. Specifically, for example, the fluid pressure control unit 47 of the driving device 40 controls the pump and the relief mechanism according to the instruction output from the drive control unit 65. The fluid pressure cylinder 41 drives the piston body 21 according to the operation of the fluid pressure control unit 47. As a consequence, the vessel internal pressure is controlled to approach the set pressure. Control (control of the vessel internal pressure) of the driving device 40 by the drive control unit 65 can be performed by various methods.

Specific Example 1 of Control of Vessel Internal Pressure

For example, the friction information may include a relationship between the conversion pressure (an example of the piston axial force information) shown in FIG. 3, and the pressure correction value data (the deviation amount $\alpha$). In this case, the controller 60 calculates a conversion pressure from a detected value of the piston axial force information detection unit 53. The controller 60 selects friction information corresponding to the direction of the movement of the piston 20. The controller 60 determines pressure correction value data (deviation amount $\alpha$) corresponding to the conversion pressure based on the selected friction information. The pressure calculation unit 64 calculates (estimates) the vessel internal pressure based on the conversion pressure and the pressure correction value data (deviation amount $\alpha$). Specifically, for example, when the piston body 21 moves in the insertion direction Z1, the pressure calculation unit 64 sets the vessel internal pressure to the value obtained by subtracting the deviation amount $\alpha a$ from the conversion pressure. When the piston body 21 moves in the extraction direction Z2, the pressure calculation unit 64 sets the vessel internal pressure to the value obtained by adding the deviation amount ac to the conversion pressure. The drive control unit 65 controls the driving device 40 so that the estimated vessel internal pressure approaches the set pressure.

Specific Example 2 of Control of Vessel Internal Pressure

The friction information does not need to include the pressure correction value data (the deviation amount $\alpha$) itself, and may include information convertible to the pressure correction value data. For example, the friction information may include a relationship between the conversion pressure and the vessel internal pressure. In this case, the pressure calculation unit 64 calculates (estimates) the vessel internal pressure corresponding to the conversion pressure based on the friction information. The drive control unit 65 then controls the driving device 40 so that the estimated vessel internal pressure approaches the set pressure.

Specific Example 3 of Control of Vessel Internal Pressure

The friction information does not need to include the conversion pressure. For example, the friction information may include a relationship between the amount of strain (an example of the piston axial force information) of the piston body 21, and the vessel internal pressure. In this case, the pressure calculation unit 64 calculates (estimates) the vessel internal pressure, based on the friction information, corresponding to the amount of strain detected by the strain gauge 53a. The drive control unit 65 controls the driving device 40 so that the estimated vessel internal pressure approaches the set pressure. The above-mentioned methods to control the vessel internal pressure are only specific examples, and the vessel internal pressure can be controlled in various manners.

<Notification of Vessel Internal Pressure>

When the pressure calculation unit 64 calculates (estimates) the vessel internal pressure, the pressure notification unit 70 may notify of the calculated container internal pressure (the same applies to the pressurizing stroke and the depressurizing stroke).

<Continuation of Reciprocating Motion>

The drive control unit 65 controls the driving device 40 so that the piston body 21 performs a reciprocating motion continuously (several times). Over the entirety of the holding stroke (from the start to the end), the drive control unit 65 may continue a reciprocating motion (see FIG. 4). Except the moment when the piston body 21 changes the movement direction, the drive control unit 65 continues to move (does not stop) the piston body 21 relative to the pressure vessel 10. Note that in the holding stroke, the drive control unit 65 may temporarily stop the reciprocating motion of the piston body 21. For example, the drive control unit 65 may stop the reciprocating motion of the piston body 21 only for a time short enough (for example, short enough so that the processing of the to-be-processed object O3 is not affected) to allow the vessel internal pressure to finely fluctuates.

<Gradual Decrease of Reciprocating Motion>

The drive control unit 65 preferably controls the driving device 40 so that the reciprocating distance (amplitude) in the reciprocating motion of the piston body 21 gradually decreases. Specifically, for example, as illustrated in FIG. 5, the drive control unit 65 gradually decreases (gradually decreases the amplitude of the set pressure) the difference between the specified pressure and the set pressure. Then the amplitude of the reciprocating motion of the piston body 21 gradually decreases, and the amplitude of the change (rise and fall) in the vessel internal actual pressure gradually decreases.

The reason why it is preferable to gradually decrease the amplitude of the reciprocating motion of the piston body 21 is as follows. For example, immediately after the start of the holding stroke, the internal condition (specifically, the temperature distribution) of the pressure vessel 10 changes significantly. At the start time or immediately after the start of the holding stroke, the movement of the piston body 21 in one direction is stopped. At this point, the piston seal frictional force changes from dynamic friction force to static friction force. Therefore, immediately after the start of the holding stroke, the accuracy of the friction information may be insufficient. Specifically, for example, the difference (the actual deviation amount α) between the conversion pressure and the vessel internal actual pressure illustrated in FIG. 3 may be different from the pressure correction value data (the deviation amount α) set as the friction information. For example, the actual deviation amount α may be greater than the pressure correction value data (the deviation amount α) set as the friction information. Thus, immediately after the start of the holding stroke, the piston body 21 is caused to perform a reciprocating motion significantly to achieve the movement state of the piston body 21 as in the pressurizing stroke and depressurizing stroke, thereby achieving a highly accurate state of the friction information. Thus, the difference between the actual deviation amount α and the pressure correction value data (the deviation amount α) is likely to be small. Subsequently, the amplitude of the reciprocating motion of the piston body 21 is gradually decreased, thereby making it possible to bring the vessel internal pressure closer to the set pressure smoothly. The drive control unit 65 may gradually decrease the amplitude of the reciprocating motion of the piston body 21 at a timing (such as in the middle of the holding stroke) different from immediately after the start of the holding stroke.

The gradual decrease (for example, gradual decrease of the amplitude of the specified pressure) of the amplitude of the reciprocating motion of the piston body 21 can be performed by various methods (forms) (see FIG. 5).

Example 1 of Amplitude

The gradual decrease of the amplitude may be performed over the period from the start time to the end time of the holding stroke.

Example 2 of Amplitude

The gradual decrease of the amplitude may be performed over the period from the start time of the holding stroke to the middle of the holding stroke. For example, the gradual decrease of the amplitude may be performed over the period from the start time of the holding stroke to a time when the amplitude is decreased to a predetermined magnitude. Subsequently, the amplitude of the reciprocating motion of the piston body 21 may be constant.

Example 3 of Amplitude

The amplitude may decrease directly proportional to time, or may decrease in a relationship different from direct proportion.

Example 4 of Amplitude

The amplitude may be set (changed) according to some kind of condition (for example, the vessel internal pressure). The amplitude may be set by feedback control. The amplitude may be set, for example, by PID (Proportional Integral Differential) control.

The cycle (for example, the cycle of specified pressure) of the reciprocating motion of the piston body 21 can be set in various manners.

Example 1 of Cycle

The cycle may be constant, or may be substantially constant.

Example 2 of Cycle

The cycle may be changed according to the magnitude of the amplitude. For example, a longer cycle may be set for a larger amplitude, and a shorter cycle may be set for a smaller amplitude. For example, the cycle may gradually decrease according to gradual decrease of the amplitude.

Example 3 of Cycle

The cycle may be set according to some kind of condition (for example, the vessel internal pressure) other than amplitude.

<Specific Example of Relationship between Specified Pressure and Vessel Internal Pressure>

As an example of control of the vessel internal pressure by the drive control unit 65, the case will be described where the vessel internal pressure is controlled according to the pressure specified from the drive control unit 65 to the driving device 40. As described above, in the example illustrated in FIG. 5, the drive control unit 65 alternately specifies a specified pressure higher than the set pressure, and a specified pressure lower than the set pressure to gradually decrease the amplitude of the specified pressure. As a consequence, the amplitude of the reciprocating motion of the piston body 21 gradually decreases, and the amplitude of the vessel internal pressure gradually decreases.

In the example illustrated in FIG. 5, at the start time of the holding stroke (at the end time of the pressurizing stroke), the vessel internal pressure is equal to or substantially equal to the set pressure. In the holding stroke, the vessel internal pressure gradually approaches the set pressure while undergoing pressurization and depressurization repeatedly. In this example, the vibration center of the vessel internal pressure gradually approaches the set pressure from a value lower than the set pressure.

Figure 6:
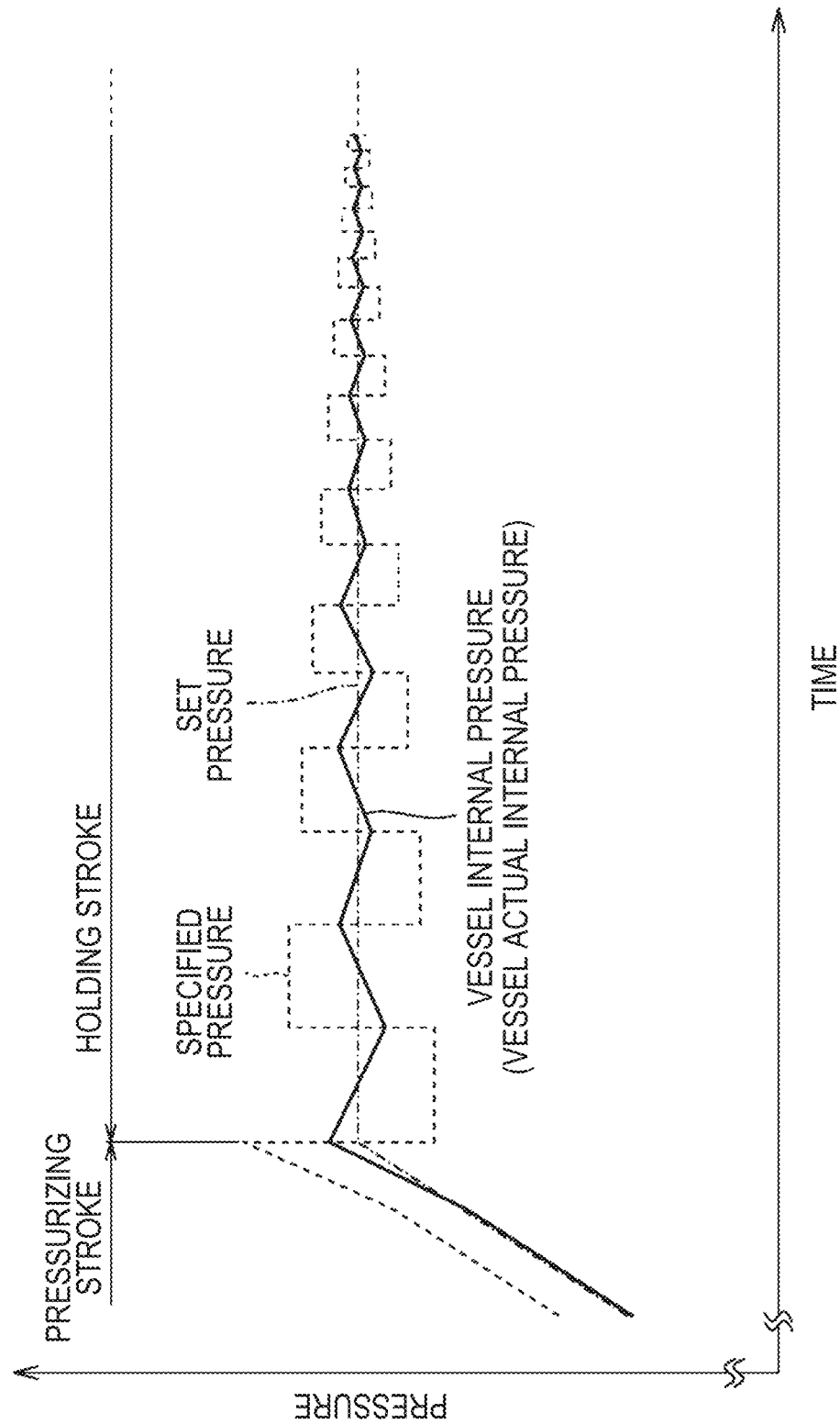
FIG. 6 is a graph corresponding to FIG. 5 when a vessel internal pressure is different from that of the example illustrated in FIG. 5.

FIG. 6 illustrates another example of the case where the vessel internal pressure is controlled according to the pressure specified from the drive control unit 65 to the driving device 40. Regarding this example, the point of difference from the example illustrated in FIG. 5 will be described. In the example illustrated in FIG. 6, at the start time of the holding stroke, the vessel internal pressure is higher than the set pressure. In the holding stroke, with respect to the set pressure, the drive control unit 65 alternately specifies a specified pressure higher than the set pressure, and a specified pressure lower than the set pressure to gradually decrease the amplitude of the specified pressure (in the same manner as in FIG. 5). In this case, the vibration center of the vessel internal pressure is the same as or substantially the same as in the set pressure.

Figure 7:
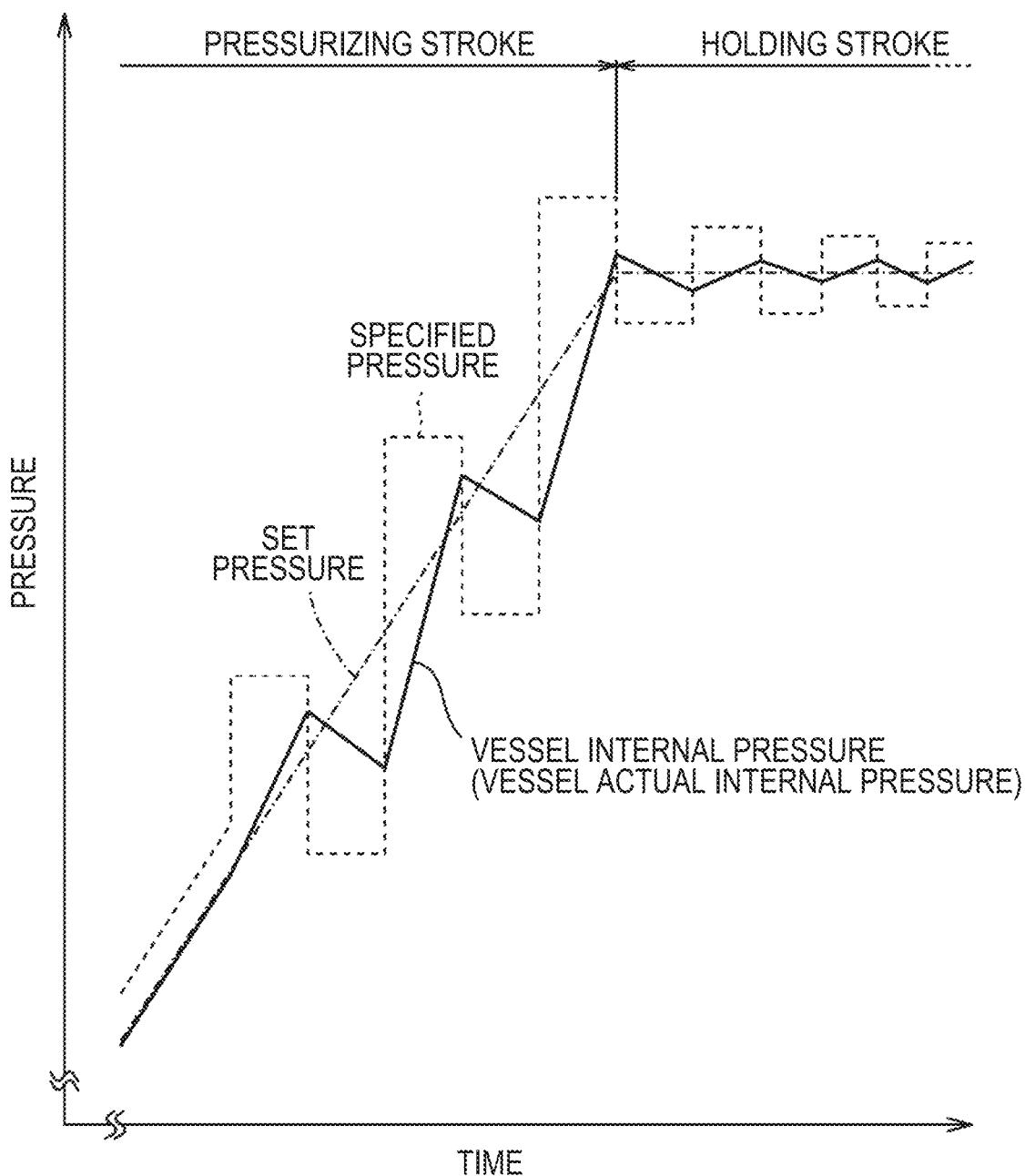
FIG. 7 is a graph corresponding to FIG. 5 when a piston body 21 illustrated in FIG. 1 is caused to perform a reciprocating motion before the start of the holding stroke shown in FIG. 5.

FIG. 7 illustrates another example of the case where the vessel internal pressure is controlled according to the pressure specified from the drive control unit 65 to the driving device 40. Regarding this example, the point of difference from the example illustrated in FIG. 6 will be described. In the example illustrated in FIG. 7, the drive control unit 65 causes the piston body 21 to perform a reciprocating motion over the period from the previous stroke of the holding stroke to the holding stroke. Specifically, for example, from the previous stroke of the holding stroke, the drive control unit 65 alternately specifies a specified pressure higher than the set pressure, and a specified pressure lower than the set pressure. As a consequence, the piston body 21 performs a reciprocating motion over the period from the previous stroke of the holding stroke to the holding stroke.

The "previous stroke of the holding stroke" may be a pressurizing stroke, or a depressurizing stroke. The drive control unit 65 may gradually decrease, or may not gradually decrease the amplitude of the reciprocating motion of the piston body 21 in the previous stroke of the holding stroke.

The effect achieved by the pressing device 1 of the present embodiment illustrated in FIG. 1 is as follows. The pressing device 1 includes the pressure vessel 10, the piston body 21, the piston seal 23, the piston axial force information detection unit 53, the driving device 40, the friction information storage unit 62, and the drive control unit 65. The piston body 21 is fitted inside the pressure vessel 10 movably in the insertion direction Z1 and the extraction direction Z2 relative to the pressure vessel 10. The piston seal 23 is provided in the piston body 21 to seal the gap between the piston body 21 and the pressure vessel 10. The piston axial force information detection unit 53 detects piston axial force information pertaining to the axial force applied to the piston body 21 in the movement direction (the axial direction Z) of the piston body 21 relative to the pressure vessel 10. The driving device 40 moves the piston body 21 relative to the pressure vessel 10.

[Configuration 1-1] The friction information storage unit 62 (see FIG. 2) stores friction information pertaining to the frictional force (piston seal frictional force) between the piston seal 23 and the pressure vessel 10 when the piston body 21 moves relative to the pressure vessel 10. The drive control unit 65 (see FIG. 2) controls the driving device 40 based on the piston axial force information detected by the piston axial force information detection unit 53, and the friction information stored in the friction information storage unit 62 (see FIG. 2).

[Configuration 1-2] The drive control unit 65 (see FIG. 2) controls the driving device 40 so that the piston body 21 performs a reciprocating motion relative to the pressure vessel 10 in the holding stroke in which the pressure inside the pressure vessel 10 is controlled to be maintained at constant.

In the above-described [Configuration 1-1], the drive control unit 65 (see FIG. 2) controls the driving device 40 based on the friction information stored in the friction information storage unit 62 (see FIG. 2). The friction information is the one when the piston body 21 moves relative to the pressure vessel 10.

In the above-described [Configuration 1-2], the drive control unit 65 causes the piston body 21 to perform a reciprocating motion (that is, to move) relative to the pressure vessel 10 in the holding stroke (see FIG. 5). Thus, the friction information when the piston body 21 moves relative to the pressure vessel 10 can be applied to the control of the driving device 40 in the holding stroke. Thus, as compared to when the piston body 21 is stopped relative to the pressure vessel 10 in the holding stroke, the pressing device 1 can control the pressure (vessel internal pressure) inside the pressure vessel 10 with high accuracy in the holding stroke.

In the [Configuration 1-2], the piston body 21 is caused to perform a reciprocating motion (that is, to move) relative to the pressure vessel 10, thus the piston seal frictional force is a dynamic friction force less than a static friction force (in period except when the direction of movement of the piston body 21 is switched). Thus, the piston body 21 is likely to follow and move in response to temperature change inside the pressure vessel 10. Thus, even when the temperature inside the pressure vessel 10 changes in the holding stroke, the vessel internal pressure is likely to be maintained. Thus, as compared to when the piston body 21 is stopped relative to the pressure vessel 10 in the holding stroke, the pressing device 1 can control the pressure (vessel internal pressure) inside the pressure vessel 10 with high accuracy in the holding stroke.

[Configuration 2] The friction information storage unit 62 (see FIG. 2) stores the friction information when the piston body 21 moves in the insertion direction Z1 relative to the pressure vessel 10, and the friction information when the piston body 21 moves in the extraction direction Z2 relative to the pressure vessel 10. The drive control unit 65 (see FIG. 2) selects friction information corresponding to the direction of the movement of the piston body 21 relative to the pressure vessel 10, and controls the driving device 40 based on the selected friction information.

The following effect is obtained by adopting the above-described [Configuration 2]. The piston seal frictional force may be different depending on the direction of the movement of the piston body 21 relative to the pressure vessel 10

(see FIG. 3). In the [Configuration 2], the driving device 40 is controlled based on the friction information corresponding to the direction of the movement of the piston body 21. Therefore, the pressing device 1 can control the vessel internal pressure with higher accuracy.

[Configuration 3] The friction information storage unit 62 (see FIG. 2) stores the friction information for each of movement speeds in a plurality of patterns of the piston body 21 relative to the pressure vessel 10. The drive control unit 65 selects friction information corresponding to the movement speed of the piston body 21 relative to the pressure vessel 10, and controls the driving device 40 based on the selected friction information.

The following effect is obtained by adopting the above-described [Configuration 3]. The piston seal frictional force may be different depending on the movement speed of the piston body 21 relative to the pressure vessel 10. In the [Configuration 3], the driving device 40 is controlled based on the friction information corresponding to the movement speed of the piston body 21. Therefore, the pressing device 1 can control the vessel internal pressure with higher accuracy.

[Configuration 4] The pressing device 1 includes the piston position information detection unit 51. The piston position information detection unit 51 detects position information of the piston body 21 relative to the pressure vessel 10.

In the above-described [Configuration 4], the piston position information detection unit 51 detects position information of the piston body 21 relative to the pressure vessel 10. Thus, the piston position information detection unit 51 can reliably (directly) detect that the piston body 21 is moving relative to the pressure vessel 10. Thus, the piston position information detection unit 51 can detect (confirm, guarantee) that the driving device 40 is in a state of being controllable based on the friction information when the piston body 21 moves relative to the pressure vessel 10. As a consequence, the pressing device 1 can control the vessel internal pressure with higher accuracy.

When the pressing device 1 has the [Configuration 2] and the [Configuration 4], the following effect is further obtained. In the [Configuration 2], the drive control unit 65 (see FIG. 2) controls the driving device 40 based on the friction information corresponding to the direction of the movement of the piston body 21 relative to the pressure vessel 10. In the [Configuration 4], the piston position information detection unit 51 can reliably (directly) detect the direction of the movement of the piston body 21 relative to the pressure vessel 10 by detecting the position information of the piston body 21 relative to the pressure vessel 10. As a consequence, the pressing device 1 can control the vessel internal pressure with higher accuracy.

When the pressing device 1 has the [Configuration 3] and the [Configuration 4], the following effect is further obtained. In the [Configuration 3], the drive control unit 65 (see FIG. 2) controls the driving device 40 based on the friction information corresponding to the movement speed of the piston body 21 relative to the pressure vessel 10. In the [Configuration 4], the piston position information detection unit 51 can reliably (directly) detect the movement speed of the piston body 21 relative to the pressure vessel 10 by detecting the position information of the piston body 21 relative to the pressure vessel 10. As a consequence, the pressing device 1 can control the vessel internal pressure with higher accuracy.

[Configuration 5] The piston axial force information detection unit 53 includes the strain gauge 53a. The strain gauge 53a is mounted on the piston body 21 to detect the strain of the piston body 21.

The strain gauge 53a in the above-described [Configuration 5] can directly detect the piston axial force information. Thus, the accuracy of the piston axial force information can be improved. Specifically, for example, when the piston axial force information is the pressure of the working fluid of the driving device 40 that drives the piston body 21 (described later), the piston axial force information is affected by the frictional force of the ram seal 41d. In contrast, in the [Configuration 5], the piston axial force information acquired from the strain gauge 53a is not affected by the frictional force of the ram seal 41d. Because the piston axial force information can be directly detected by the strain gauge 53a, the drive control unit 65 (see FIG. 2) can control (the [Configuration 1-1]) the driving device 40 with higher accuracy based on the piston axial force information and the friction information. As a consequence, the pressing device 1 can control the vessel internal pressure with higher accuracy.

[Configuration 7] The drive control unit 65 (see FIG. 2) controls the driving device 40 so that the reciprocating distance in the reciprocating motion of the piston body 21 relative to the pressure vessel 10 gradually decreases in the holding stroke.

By adopting the above-described [Configuration 7], the drive control unit 65 (see FIG. 2) can gradually decrease the difference between the vessel internal pressure (for example, the "set pressure") as a target, and the vessel internal actual pressure. Thus, the drive control unit 65 (see FIG. 2) can control the vessel internal pressure so that it appropriately approaches the vessel internal pressure as a target. As a consequence, the pressing device 1 can control the vessel internal pressure with higher accuracy.

[Configuration 8] The pressing device 1 includes the pressure detection member 80. The pressure detection member 80 is provided removably from the pressure vessel 10. The pressure detection member 80 detects the pressure (vessel internal pressure) inside the pressure vessel 10. The friction information is acquired based on the piston axial force information detected by the piston axial force information detection unit 53, and the pressure inside the pressure vessel 10 detected by the pressure detection member 80 at the time of movement of the piston body 21 relative to the pressure vessel 10.

By adopting the above-described [Configuration 8], friction information is reliably acquired based on the actually measured value (vessel internal actual pressure) of the vessel internal pressure detected by the pressure detection member 80. As a consequence, the pressing device 1 can control the vessel internal pressure with higher accuracy.

In the [Configuration 8], the pressure detection member 80 is removable from the pressure vessel 10. Thus, for example, even when the pressure detection member 80 or the pressure derivation member De cannot withstand the actual operation for a long time, after the friction information is acquired, the pressure detection member 80 or the pressure derivation member De can be detached from the pressure vessel 10 before the actual operation.

[Configuration 9] The pressure detection member 80 is disposed inside the pressure vessel 10 removably from the inside of the pressure vessel 10. The friction information is acquired with the pressure detection member 80 disposed inside the pressure vessel 10.

By adopting the above-described [Configuration 9], the pressure detection member 80 can detect the vessel internal actual pressure more directly with the pressure detection member 80 disposed inside the pressure vessel 10. As a consequence, the accuracy of the friction information can be improved. As a consequence, the pressing device 1 can control the vessel internal pressure with higher accuracy.

In the [Configuration 9], the pressure detection member 80 is removable from the pressure vessel 10. Thus, for example, even when the pressure detection member 80 cannot withstand the actual operation for a long time, after the friction information is acquired, the pressure detection member 80 can be removed from the pressure vessel 10 before the actual operation.

Modifications

In the above embodiments, the piston axial force information detected by the piston axial force information detection unit 53 includes information obtained by directly detecting the axial force of the piston body 21, or information convertible from the aforementioned information. Specifically, for example, the piston axial force information includes information pertaining to the detected value of the strain gauge 53a. In contrast, the piston axial force information detected by the piston axial force information detection unit 53 may include information pertaining to the force for pressing the piston body 21 by the driving device 40 in the insertion direction Z1. For example, when the driving device 40 drives the piston body 21 by a fluid pressure, the piston axial force information may include information pertaining to the pressure of a working fluid for pressing the piston body 21 in the insertion direction Z1.

In the following, the case will be described where the piston axial force information detected by the piston axial force information detection unit 53 pertains to the pressure of a working fluid for pressing the piston body 21 in the insertion direction Z1. For example, the piston axial force information may pertain to the pressure of the working fluid of the head-side chamber 41a1. The piston axial force information may pertain to the fluid pressure detected by the fluid pressure detection unit 45. The piston axial force information detection unit 53 to detect piston axial force information, and the fluid pressure detection unit 45 to control the driving device 40 may be used concurrently. Note that the piston axial force information detection unit 53 may not be used concurrently with the fluid pressure detection unit 45. More particularly, the piston axial force information detection unit 53 for detecting, as the piston axial force information, information pertaining to the pressure of a working fluid for pressing the piston body 21 in the insertion direction Z1 may be provided separately from the fluid pressure detection unit 45. In the following, the case will be mainly described where the piston axial force information detection unit 53 is used concurrently with the fluid pressure detection unit 45.

When the piston axial force information pertains to the fluid pressure for pressing the piston body 21 in the insertion direction Z1, the piston axial force information includes an effect of the frictional force (ram seal frictional force) between the ram seal 41d and the cylinder body 41a. More particularly, the piston axial force information includes the effect of the axial force of the piston body 21 caused by the vessel internal pressure, of the axial force of the piston body 21 caused by the piston seal frictional force, and of the axial force of the piston body 21 caused by the ram seal frictional force.

In this modification, friction information considering the ram seal frictional force is acquired in the prior measurement. More particularly, in the prior measurement, information pertaining to the fluid pressure detected by the piston axial force information detection unit 53 (for example, the fluid pressure detection unit 45) is acquired as the piston axial force information including the effect of the ram seal frictional force. A relationship (prior measurement acquisition relationship R (see FIG. 3)) between the piston axial force information, and the vessel internal actual pressure is acquired. The friction information to be stored in the friction information storage unit 62 (see FIG. 2) is acquired based on the prior measurement acquisition relationship R.

In this modification, as in the prior measurement, also in the actual operation, information pertaining to the fluid pressure detected by the piston axial force information detection unit 53 (for example, the fluid pressure detection unit 45) is acquired as the piston axial force information. The drive control unit 65 (see FIG. 2) controls the driving device 40 based on the piston axial force information including the effect of the ram seal frictional force, and friction information considering the ram seal frictional force. Thus, as in the above embodiments, the drive control unit 65 can control the driving device 40. As a consequence, the pressing device 1 can control the vessel internal pressure with high accuracy.

As in the above embodiments, it is preferable that the conditions affecting the friction information be the same between the prior measurement and the actual operation as much as possible. For example, it is preferable that the temperature of the working fluid of the driving device 40 be the same or substantially the same between the prior measurement and the actual operation. For example, in the prior measurement, friction information may be acquired at various temperatures of working fluid. At the time of actual operation, the drive control unit 65 (see FIG. 2) selects friction information corresponding to the detected temperature of working fluid, and may control the driving device 40 based on the selected friction information.

The effect achieved by the pressing device 1 in the modification is as follows. The driving device 40 includes the fluid pressure cylinder 41, the fluid pressure detection unit 45, and the fluid pressure control unit 47. The fluid pressure cylinder 41 moves the piston body 21 by a fluid pressure. The fluid pressure detection unit 45 detects a fluid pressure supplied to the fluid pressure cylinder 41. The fluid pressure control unit 47 controls the operation of the fluid pressure cylinder 41 based on the fluid pressure detected by the fluid pressure detection unit 45.

[Configuration 6] The piston axial force information detected by the piston axial force information detection unit 53 includes the fluid pressure detected by the fluid pressure detection unit 45.

In the above-described [Configuration 6], the piston axial force information includes the fluid pressure of a hydraulic fluid for controlling the operation of the fluid pressure cylinder 41, the fluid pressure being detected by the fluid pressure detection unit 45. Thus, the piston axial force information detection unit 53, and the fluid pressure detection unit 45 can be used concurrently. Thus, a sensor (for example, the strain gauge 53a) to acquire the piston axial force information does not need to be provided separately from the fluid pressure detection unit 45 for controlling the operation of the fluid pressure cylinder 41. Therefore, the pressing device 1 can have a simple configuration.

When the piston axial force information detection unit 53 (for example, the strain gauge 53a) is provided separately from the fluid pressure detection unit 45, maintenance for each of the fluid pressure detection unit 45 and the piston axial force information detection unit 53 is needed. Specifically, for example, the strain gauge 53a deteriorates over time, thus maintenance for the strain gauge 53a is needed. In contrast, when the piston axial force information detection unit 53, and the fluid pressure detection unit 45 are used concurrently, effort and time for maintenance work can be reduced.

Other Modifications

The above embodiments and modifications may be further modified in various manners. For example, the number of components of the above embodiments may be changed, and part of the components may not be provided. For example, components may be directly or indirectly fixed or connected. For example, connection between the components illustrated in FIG. 2 may be changed. The arrangement of the components illustrated in FIG. 1 may be changed. For example, the inclusion relationship between the components may be changed in various manners. For example, a component described as a lower component included in an upper component may not be included in the upper component, and may be included in another component. For example, components described as multiple different members or portions may be one member or portion. For example, a component described as one member or portion may be divided into and provided as multiple different members or portions. For example, various parameters (specifically, for example, the amplitude and the cycle of the reciprocating motion of the piston body 21) may be pre-set in the controller 60, or may be directly set by manual operation of an operator. Various parameters may be calculated by the controller 60 based on the information detected by a sensor (for example, the piston axial force information detection unit 53). For example, various parameters may not be changed, or may be changed by manual operation, or may be automatically changed by the controller 60 according to some kind of condition. For example, each component may have only part of features (such as action function, arrangement, shape, and operation).

A pressing device according to a first aspect of the present invention includes: a pressure vessel; a piston body fitted into an inside of the pressure vessel movably in an insertion direction and an extraction direction relative to the pressure vessel; a piston seal provided in the piston body and configured to seal a gap between the piston body and the pressure vessel; a piston axial force information detection unit configured to detect piston axial force information pertaining to an axial force applied to the piston body in a movement direction of the piston body relative to the pressure vessel; a driving device configured to move the piston body relative to the pressure vessel; a friction information storage unit configured to store friction information pertaining to a frictional force between the piston seal and the pressure vessel when the piston body moves relative to the pressure vessel; and a drive control unit configured to control the driving device based on the piston axial force information detected by the piston axial force information detection unit, and the friction information stored in the friction information storage unit. In a holding stroke for controlling a pressure inside the pressure vessel so as to be constantly held, the drive control unit controls the driving device so that the piston body performs a reciprocating motion relative to the pressure vessel.

In the pressing device according to the first aspect, the friction information storage unit may store the friction information when the piston body moves in the insertion direction relative to the pressure vessel, and the friction information when the piston body moves in the extraction direction relative to the pressure vessel, and the drive control unit may select the friction information corresponding to a direction of movement of the piston body relative to the pressure vessel, and may control the driving device based on the selected friction information.

In the pressing device according to the first or second aspect, the friction information storage unit may store the friction information of each of movement speeds in a plurality of patterns of the piston body relative to the pressure vessel, and the drive control unit may select the friction information corresponding to a movement speed of the piston body relative to the pressure vessel, and may control the driving device based on the selected friction information.

The pressing device according to any one of the first to third aspects may further include a piston position information detection unit configured to detect position information of the piston body relative to the pressure vessel.

In the pressing device according to any one of the first to fourth aspects, the piston axial force information detection unit may further include a strain gauge that is mounted on the piston body to detect strain of the piston body.

In the pressing device according to any one of the first to fifth aspects, the driving device may include: a fluid pressure cylinder configured to move the piston body by a fluid pressure; a fluid pressure detection unit configured to detect a fluid pressure supplied to the fluid pressure cylinder; and a fluid pressure control unit configured to control an operation of the fluid pressure cylinder based on the fluid pressure detected by the fluid pressure detection unit, and the piston axial force information detected by the piston axial force information detection unit may include the fluid pressure detected by the fluid pressure detection unit.

In the pressing device according to any one of the first to sixth aspects, in the holding stroke, the drive control unit may control the driving device so that a reciprocating distance in the reciprocating motion of the piston body relative to the pressure vessel gradually decreases.

The pressing device according to any one of the first to seventh aspects may further include a pressure detection member provided removably from the pressure vessel, and configured to detect a pressure inside the pressure vessel, and the friction information may be acquired based on the piston axial force information detected by the piston axial force information detection unit, and the pressure inside the pressure vessel detected by the pressure detection member when the piston body moves relative to the pressure vessel.

In the pressing device according to the eighth aspect, the pressure detection member may be disposed inside the pressure vessel removably from an inside of the pressure vessel, and the friction information may be acquired with the pressure detection member disposed inside the pressure vessel.

The invention claimed is:
1. A pressing device comprising:
a pressure vessel;
a piston body fitted into an inside of the pressure vessel movably in an insertion direction and an extraction direction relative to the pressure vessel;
a piston seal provided in the piston body and configured to seal a gap between the piston body and the pressure vessel;
a piston axial force information detection unit configured to detect piston axial force information pertaining to an axial force applied to the piston body in a movement direction of the piston body relative to the pressure vessel;

a driving device configured to move the piston body relative to the pressure vessel;

a friction information storage unit configured to store friction information pertaining to a frictional force between the piston seal and the pressure vessel when the piston body moves relative to the pressure vessel; and a drive control unit configured to control the driving device based on the piston axial force information detected by the piston axial force information detection unit, and the friction information stored in the friction information storage unit, wherein in a holding stroke for controlling a pressure inside the pressure vessel so as to be constantly held, the drive control unit controls the driving device so that the piston body performs a reciprocating motion relative to the pressure vessel.

2. The pressing device according to claim 1, wherein the friction information storage unit stores the friction information when the piston body moves in the insertion direction relative to the pressure vessel, and the friction information when the piston body moves in the extraction direction relative to the pressure vessel, and the drive control unit selects the friction information corresponding to a direction of movement of the piston body relative to the pressure vessel, and controls the driving device based on the selected friction information.

3. The pressing device according to claim 1, wherein the friction information storage unit stores the friction information of each of movement speeds in a plurality of patterns of the piston body relative to the pressure vessel, and the drive control unit selects the friction information corresponding to a movement speed of the piston body relative to the pressure vessel, and controls the driving device based on the selected friction information.

4. The pressing device according to claim 1, further comprising a piston position information detection unit configured to detect position information of the piston body relative to the pressure vessel.

5. The pressing device according to claim 1, wherein the piston axial force information detection unit further includes a strain gauge that is mounted on the piston body to detect strain of the piston body.

6. The pressing device according to claim 1, wherein the driving device includes:
  a fluid pressure cylinder configured to move the piston body by a fluid pressure;
  a fluid pressure detection unit configured to detect a fluid pressure supplied to the fluid pressure cylinder; and
  a fluid pressure control unit configured to control an operation of the fluid pressure cylinder based on the fluid pressure detected by the fluid pressure detection unit,
  wherein the piston axial force information detected by the piston axial force information detection unit includes the fluid pressure detected by the fluid pressure detection unit.

7. The pressing device according to claim 1, wherein in the holding stroke, the drive control unit controls the driving device so that a reciprocating distance in the reciprocating motion of the piston body relative to the pressure vessel gradually decreases.

8. The pressing device according to claim 1, further comprising a pressure detection member provided removably from the pressure vessel, and configured to detect a pressure inside the pressure vessel, wherein the friction information is acquired based on the piston axial force information detected by the piston axial force information detection unit, and the pressure inside the pressure vessel detected by the pressure detection member when the piston body moves relative to the pressure vessel.

9. The pressing device according to claim 8, wherein the pressure detection member is disposed inside the pressure vessel removably from an inside of the pressure vessel, and the friction information is acquired with the pressure detection member disposed inside the pressure vessel.

* * * * *